(12) United States Patent
Sakuyama

(10) Patent No.: US 7,031,541 B2
(45) Date of Patent: Apr. 18, 2006

(54) SYSTEM, METHOD AND PROGRAM FOR IMPROVED COLOR IMAGE SIGNAL QUANTIZATION

(75) Inventor: Hiroyuki Sakuyama, Tokyo-to (JP)

(73) Assignee: Ricoh Company, Ltd., Tokyo (JP)

( * ) Notice: Subject to any disclaimer, the term of this patent is extended or adjusted under 35 U.S.C. 154(b) by 772 days.

(21) Appl. No.: 09/912,364

(22) Filed: Jul. 26, 2001

(65) Prior Publication Data
US 2002/0039440 A1 Apr. 4, 2002

(30) Foreign Application Priority Data
Jul. 26, 2000 (JP) .............................. 2000-225692

(51) Int. Cl.
G06K 9/36 (2006.01)
G06K 9/38 (2006.01)
G06K 9/46 (2006.01)

(52) U.S. Cl. ..................... 382/251; 382/166; 348/391.1

(58) Field of Classification Search ................ 382/162, 382/166, 169, 251–253, 270–273; 348/391.1, 348/405.1; 704/230; 375/240.03; 384/251–253
See application file for complete search history.

(56) References Cited

U.S. PATENT DOCUMENTS

| | | | |
|---|---|---|---|
| 5,072,290 A * | 12/1991 | Yamagami et al. | .... 375/240.25 |
| 5,307,088 A | 4/1994 | Inuzuka et al. | |
| 5,377,025 A * | 12/1994 | Spaulding et al. | .......... 358/518 |
| 5,684,920 A * | 11/1997 | Iwakami et al. | ............ 704/203 |
| 6,246,345 B1 * | 6/2001 | Davidson et al. | ............. 341/51 |

FOREIGN PATENT DOCUMENTS

JP 60-197072 10/1985

OTHER PUBLICATIONS

U.S. Appl. No. 10/600,333, filed Jun. 23, 2003, Suino et al.
U.S. Appl. No. 10/646,754, filed Aug. 25, 2003, Kodama et al.
U.S. Appl. No 10/647,337, filed Aug. 26, 2003, Sakuyama et al.
U.S. Appl. No. 10/659,349, filed Sep. 11, 2003, Nomizu et al.

(Continued)

Primary Examiner—Kanjibhai Patel
Assistant Examiner—Yubin Hung
(74) Attorney, Agent, or Firm—Oblon, Spivak, McClelland, Maier & Neustadt, P.C.

(57) ABSTRACT

A system and method of processing a component color image signal extracted from image signals are disclosed, including a quantizing unit for quantizing the component color image signal over a plurality of quantization regions of the component color image signal, such that the color difference per unit error caused by quantization of the component color image signal in each of the plurality of quantization regions is within a predetermined value. This quantizing unit operates also to quantize the component color image signal under a quantization level number different for each of regions specified by the value of the component color image signal, as a threshold, corresponding to either the polarity change or the maximum of the component color image signal.

38 Claims, 16 Drawing Sheets

OTHER PUBLICATIONS

U.S. Appl. No. 10/682,121, filed Oct. 10, 2003, Hara et al.
U.S. Appl. No. 10/691,623, filed Oct. 24, 2003, Hara et al.
U.S. Appl. No. 10/703,509, filed Nov. 10, 2003, Nomizu et al.
U.S. Appl. No. 10/716,429, filed Nov. 20, 2003, Nomizu et al.
U.S. Appl. No. 10/623,558, filed Jul. 22, 2003, Sakuyama et al.

* cited by examiner

SYSTEM, METHOD AND PROGRAM FOR IMPROVED COLOR IMAGE SIGNAL QUANTIZATION

BACKGROUND

1. Field

This patent specification relates generally to image processing, and more specifically to systems and methods for image processing by improved color image signal quantization and compression, and computer accessible storage media for implementing such processing.

2. Discussion of the Background

As the use of color imaging apparatuses becomes more widespread, it becomes increasingly important to improve techniques capable of suitably handling image data and providing color images which are reproduced with deviation as small as possible with respect to original images.

In the transmission and storage of the image data, it is known in general to provide encoding (or quantization) and compression of color image data in order to reduce the data size to be processed.

It is also known in the data processing that RGB components for the primary colors are correlated highly each other. Prior to the image data compression, therefore, the image data are subjected to the color transformation into less correlated components such as lightness and color signals.

Several methods have been adopted for the color image signal transformation such as, for example, the YCbCr transform which carries out the transformation from RGB components into brightness signals Y and color signals Cb and Cr, utilizing the transformation matrix $$\begin{bmatrix} Y \\ Cb \\ Cr \end{bmatrix} = \begin{bmatrix} 0.29 & 0.587 & 0.114 \\ 0.1687 & -0.3313 & 0.5 \\ 0.5 & -0.4187 & 0.0813 \end{bmatrix} \begin{bmatrix} R \\ G \\ B \end{bmatrix}. \quad (1)$$

The reversible component transform (RCT) may also be used alternatively as a simpler and faster method, in which RGB components are transformed into brightness signals Y and color signals U and V, utilizing the transformation matrix $$\begin{cases} Y = \lfloor (R + 2G + B)/4 \rfloor \\ U = R - G \\ V = B - G \end{cases}, \quad (2)$$

where the notation $\lfloor \ \rfloor$ is for representing the floor function.

Incidentally, since the above noted transform operations are obviously reversible, RGB components can be reproduced by performing the reverse transform on the brightness signals Y and color signals U and V.

The RCT transformation method is implemented in general to decorrelate the RGB components in pixels, thereby improving the rate of data compression, and has the form as simple as possible placing priority on higher speeds of data processing.

This results in a non-uniform color space such as those exemplified by YUV after the color transformation, in which the magnitude of the variation in the brightness signals Y and color signals U and V, in general, does not correspond linearly to that of human color perception. This may also result in a decrease in color image quality, that is recognized when color component are quantized linearly, especially with a higher degree of data compression.

In previous methods, however, color signal transformation have been carried out in practice to achieve the quantization with more ease (for example, quantizing linearly) rather than utilizing the original RCT capability of the high rate of data compression. Namely, color signals are subjected to the transformation into a uniform color space such as, for example, the Lab space (CIE 1976) with linear color characteristics, and the color space is then divided in uniform into a plurality of quantization regions, according the pervious methods.

As an example, U.S. Pat. No. 5,307,088 describes a method of first transforming RGB components into the Lab space and then quantizing or encoding the resultant signals in this space, in a similar manner to the above noted methods of transforming into a uniform color space and subsequently dividing in uniform into multiple quantization regions.

Also, U.S. Pat. No. 5,072,290 describes a method of quantizing and encoding in the Lab space, in which further means of referencing the variable L is proposed, since the Lab space is not a uniform color space to be exact.

These methods are both designed such that the color signals be transformed into a uniform color space, and that quantization or encoding of color components is carried out in consideration primarily of the ease of computation, rather than utilizing the characteristics of the color space, in which high speed transformation can be achieved. That is, the ease of the quantization steps is regarded highly at the expense of the speed.

However, since a relatively large amount of computation is required in general for the transformation into the Lab space, the above described methods are not entirely suitable for the high speed computation for the color signal transformation. Moreover, when additional steps for the quantization are included such as referring to L as the variable, as described above, this may give rise to a considerable decrease in speed of the signal transformation.

SUMMARY

Accordingly, it is an object of the present disclosure to provide improved systems and methods for color image signal processing, having most, if not all, of the advantages and features of similar employed apparatuses and methods, while eliminating many of their disadvantages.

It is another object of the present disclosure to provide systems and methods for color image signal processing, and computer accessible storage media for implementing such methods, capable of satisfactorily handling color image signals and providing color images which are reproduced with the deviation in color as small as possible with respect to original images.

The following brief description is a synopsis of only selected features and attributes of the present disclosure. A more complete description thereof is found below in the section entitled "Description of the Preferred Embodiments".

An image processing system is disclosed herein for processing a component color image signal extracted from image signals, including at least a quantizing unit for quantizing the component color image signal over a plurality of quantization regions of the component color image signal, such that the color difference per unit error caused by quantization of the component color image signal in each of the plurality of quantization regions is within a predetermined value.

This quantizing unit is configured also to quantize low frequency components of the component color image signal, compute the color difference per unit error by averaging color differences over all values of G, as a parameter, among components R, G and B; and obtain the color difference per unit error as an envelope drawn through maximal points of color difference versus component color image signal plots for all values of the G parameter among components R, G and B.

According to another aspect, the image processing system includes at least a quantizing unit for quantizing the component color image signal under a quantization level number different for each of the regions specified by the value of the component color image signal corresponding to the maximum of the color difference per unit error caused by quantization of the component color image signal.

This quantizing unit is configured also to obtain the color difference per unit error as an envelope drawn through maximal points of color difference versus component color image signal plots for all values of the G parameter, and linearly quantize the component color image signal in at least one of regions specified by the value of the component color image signal, as a threshold, corresponding to either the polarity change or the maximum thereof.

According to still another aspect, the image processing system includes at least a quantizing unit for quantizing one of a plurality of component color image signals depending on other component color image signals which are not quantized presently.

According to another aspect, the image processing system includes a quantizing unit for quantizing one of the plurality of component color image signals depending on the position thereof on the plane identified by a subsection of the plane, in which the plane is specified by the plurality of component color image signals, as parameters, and divided into a plurality of the subsections with respect to a locus of maximal points of the color difference per unit error caused by a quantization error of the component color image signal to be presently quantized, and which the component color image signal in at least one of the plurality of subsections is linearly quantized.

According to another aspect, the image processing system for processing first and second component color image signals includes at least a quantizing unit for quantizing the first component color image signal and the distance of the position from a locus of the points of equal values of the first and second component color image signals, in which the position is determined so as to correspond to the first and second component color image signals on the plane specified by the first and second component color image signals. This quantizing unit also operates to quantize at least one of the difference between first and second component color image signals, and either one of the first and second component color image signals.

Methods and computer accessible storage media are also disclosed in the present specification for implementing the foregoing processing.

The present disclosure and features and advantages thereof will be more readily apparent from the following detailed description and appended claims when taken with drawings.

DESCRIPTION OF THE PREFERRED EMBODIMENTS

Figure 1:
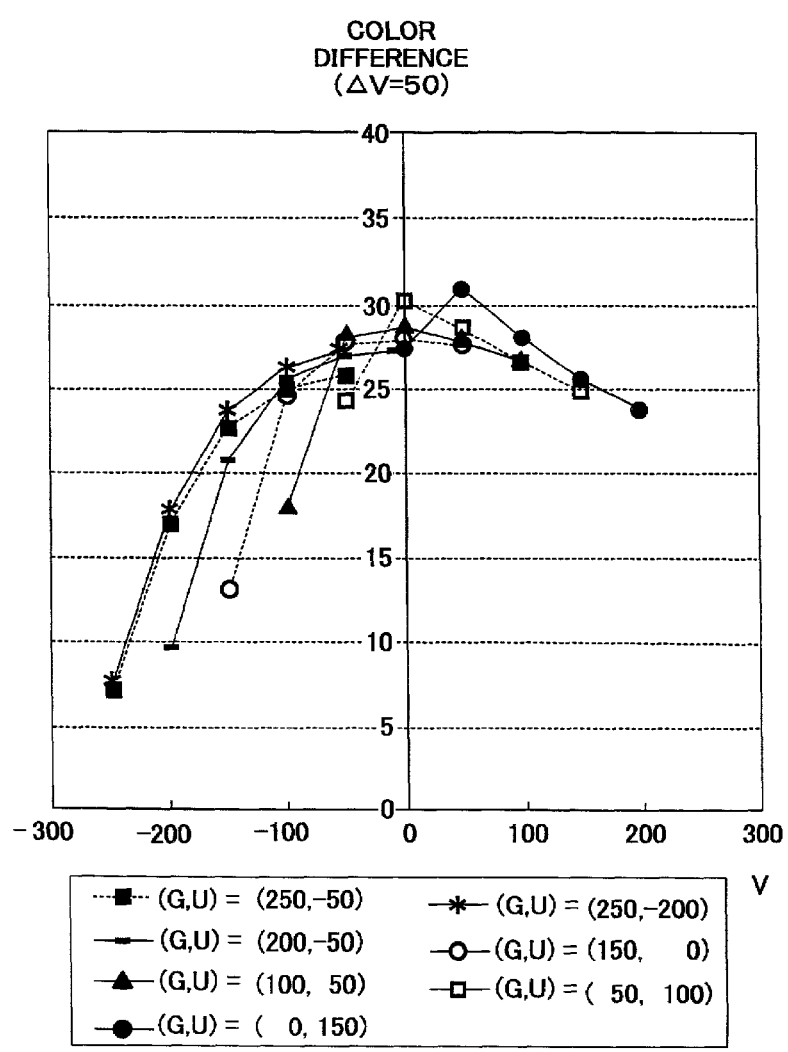
FIG. 1 includes graphical plots illustrating the change in the Lab color difference with the color signal V according to computation steps disclosed herein.

The present patent specification discloses a method, in which the quantization of color image signals is carried out in consideration primarily of the speed of color transformation, still utilizing fully the ease of the quantization process, as indicated earlier. That is, even using a color space, in which the quantization of color components is not necessarily carried out easily, the present method can achieve the quantization making full use of characteristics of the uniform color space.

To be more specific, this is achieved by appropriately setting a plurality of quantization divisions in a color space such as the YUV space, for example, prior to the signal transformation, and the plurality of quantization divisions, in turn, are formed by mapping a plurality of divisions formed in uniform in the uniform Lab space into the YUV space. It should be noted that the shape of the divisions is cubic in the Lab space, while it becomes non-cubic when mapped into the YUV space.

As a result, the distance in the YUV space, which corresponds to the difference of the same magnitude in color visually perceived (or colorimetric difference), varies from one location to another. For example, the above mentioned distance on the U axis becomes dependent on other variables Y and V.

The construction of the color space such as above is not practical for the color signals processing, since precise quantization on the V axis, for example, can be achieved after referring the values V and Y, in a similar manner to that previously disclosed in the U.S. Pat. No. 5,072,290.

Moreover, the above construction is again considered not practical, since several tables are required with respect to each of the valuables Y, U and V for carrying out such quantization, which are respectively referred to depending on the location in the space through identifying and accessing thereto.

To alleviate these difficulties it is preferable to find a method capable of achieving the quantization of each component image signals Y, U and V individually in a similar manner specified by Joint Photographic Experts Group Standards (JPEG) and JPEG 2000. In addition, the reference is to be required preferably to only one component at least such as Y, for example, but not both Y and V.

To this end, component color image signals and color signal space are first examined closely, and several characteristics thereof are found, which will be detailed herein below. In addition, the term 'component color image signal' may also be referred to as either 'component color signal' or 'color signal' in the following description.

In order to set the quantization divisions for UV components independent of the brightness component Y, there investigated is the step, in which quantization divisions mapped into the YUV space (i.e., meshes formed by dividing the YUV space) are projected onto the UV-plane.

In the case of the Lab space, the projection of a plurality of meshes onto the ab-plane forms a single and continues plane. In the YUV plane, however, a plurality of meshes projected onto the UV-plane do not necessarily form such a continuous plane, but the projected images may be shifted and overlapped each other. Even though these images are thus shifted and overlapped, it is possible to assume an image which is created by averaging the projected images, hereinafter referred to as 'average projection of the meshes'.

In the present disclosure, therefore, the method of color image signal quantization will be described according to the quantization divisions which are formed based on the average projection of the meshes.

In practical computation steps in the present disclosure, the transformation is performed by transforming the meshes in the RGB space into either Lab or YUV space, rather than Lab meshes into YUV space, as described above.

More specifically, these steps are carried out as follows.

(1) The variable V changes from a minimum to maximum, while G and U are fixed (i.e., B changes, G and R are fixed) according to the aforementioned relation (2), and the changes in Lab color difference is obtained as a function of V.

(2) The variable V changes under fixed G, U values other than those used above, and the change in Lab color difference is obtained.

FIG. 1 includes graphical plots illustrating the change in the Lab color difference as a function of the color signal V at intervals of 50, obtained according to the steps described above.

It is indicated that the Lab color difference has its maximum at, or in vicinity of, V=0, and that the change thereof is not symmetric with respect to the polarity of V. In addition, a curve obtained by averaging over all these plots may be taken as the aforementioned "average projection of the meshes". Although the change in V, $\Delta V$, is assumed to be 50 in the present computation steps, a similar trend of the plots can also found for $\Delta V=1$.

Referring to FIG. 1 again, it is indicated that the Lab color difference per $\Delta V$ is considered to be a function of V as expressed by the following relation.

$$\text{Lab color difference}/\Delta V = f(V) \qquad (3)$$

$$\therefore \text{Lab color difference} = \int_{V}^{V+\Delta V} f(V) dV$$

The Lab color difference caused by a quantization error in V, $\Delta V$, is therefore obtained as the area given by the relation (3).

Accordingly, by setting the quantization divisions such that the above defined area to be equal for the respective divisions, the Lab color difference caused by the V quantization can be brought into uniform over the plurality of the divisions. As a result, the deviation in color can be retained within a predetermined range and a uniform quality of color images can be assured.

Figure 2:
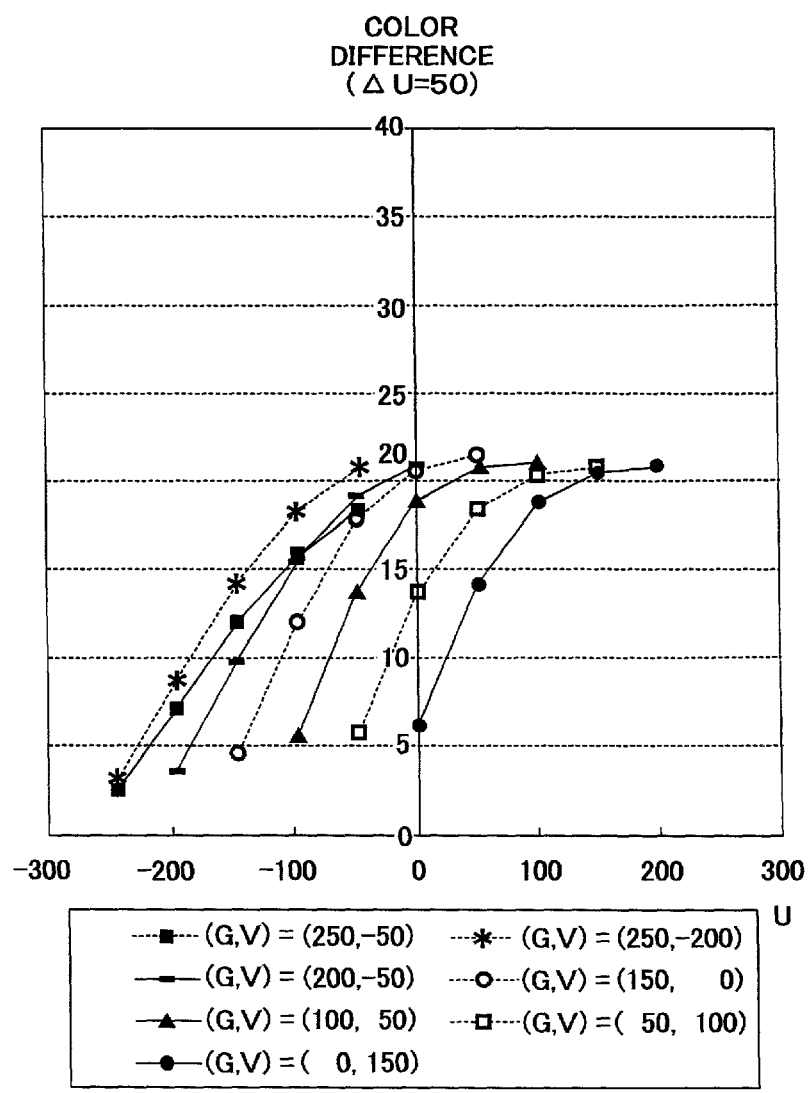
FIG. 2 includes graphical plots illustrating the change in the Lab color difference with the color signal U according to computation steps disclosed herein.

FIG. 2 includes graphical plots illustrating the change in the Lab color difference as a function of the color signal U, obtained in a similar manner to FIG. 1.

FIG. 2 illustrates the change in the Lab color difference with respect to the change in U, in which the variable V is varied from a minimum to maximum, while G and V are fixed. The plots in FIG. 2 show a shift of the overall position with the change in U, which is indicative of the shift in the aforementioned meshes.

Although the shift in FIG. 2 is larger than that of FIG. 1, it is still possible to assume the average projection of the meshes for the variable U as well, and to set the quantization divisions such that the area defined as above to be equal for the respective divisions in a similar manner to the variable V.

Also shown in FIG. 2 is that the magnitude of the overall change on the Y-axis is smaller than that of FIG. 1, in which the former magnitude amounts to approximately 60% of the latter. This, in turn, indicates the width of quantization divisions with respect to the variable U can be set smaller than that with respect to V.

As will be detailed later on, it is worth noted that an envelope which is drawn through maximal points of the plots may alternatively be adopted as the basis of the quantization divisions in place of the above noted average projection of the meshes.

Figure 3:
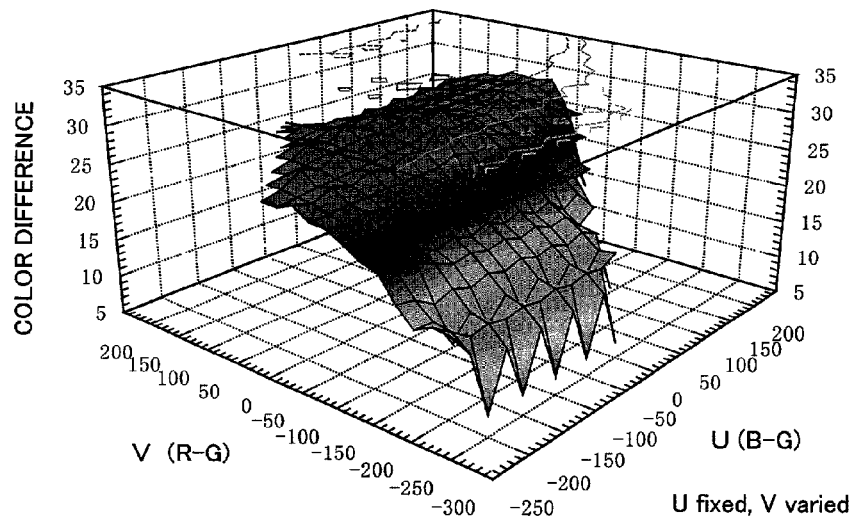
FIG. 3 is a three-dimensional representation of the average of the Lab color difference of FIG. 1.
Figure 4:
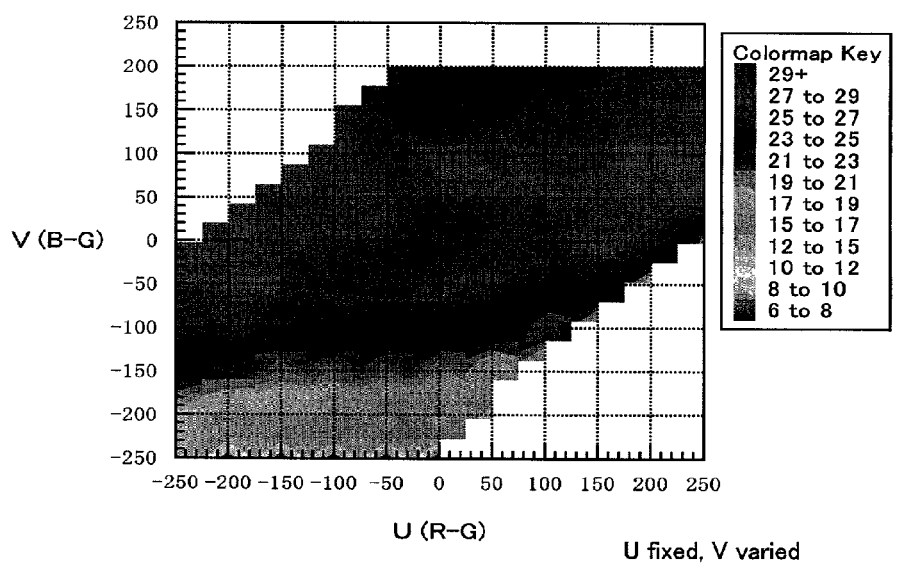
FIG. 4 is a contour map of the average of the Lab color difference of FIG. 1.
Figure 5:
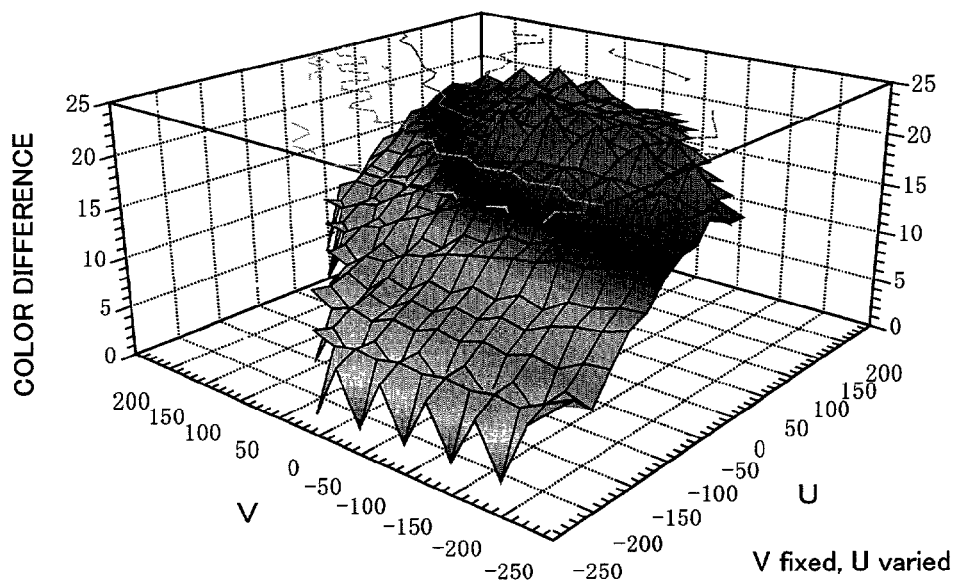
FIG. 5 is a three-dimensional representations of the average of the Lab color difference of FIG. 2.
Figure 6:
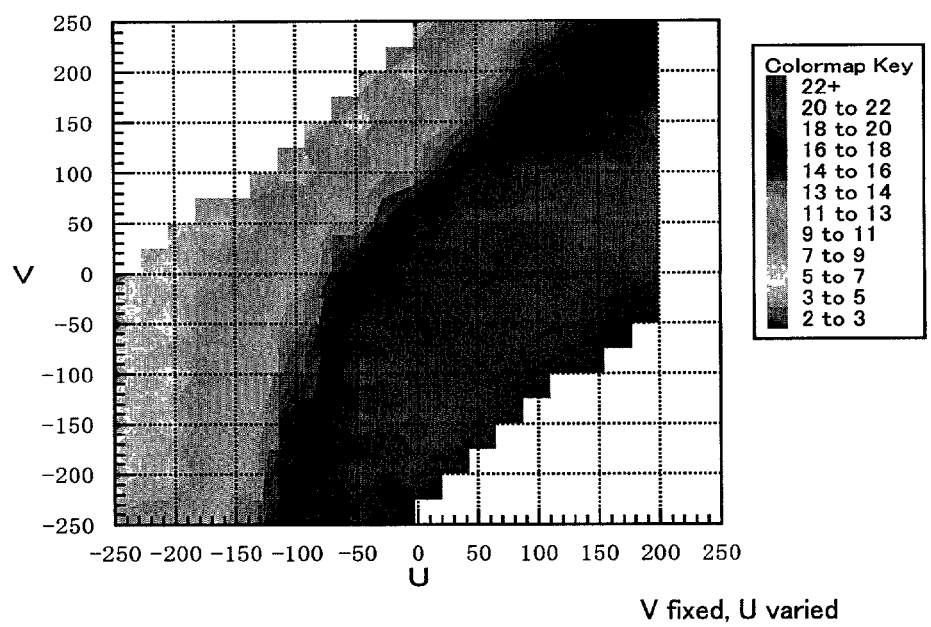
FIG. 6 is a contour map of the average of the Lab color difference of FIG. 2.

Further results from the present examination are also shown, in which FIGS. 3 and 5 are three-dimensional representations, and FIGS. 4 and 6 are contour maps, of the averages of the Lab color difference of FIGS. 1 and 2, respectively.

In the description which follows, specific embodiments of the apparatus and method based on the foregoing findings are detailed, which are particularly useful for image data encoding or quantization, and compression in use for the transmission and storage of color image data.

It is understood, however, that the present disclosure is not limited to these embodiments. For example, the use of the image processing system and method disclosed herein may also be adaptable to any form of information data processing. Other embodiments will be apparent to those skilled in the art upon reading the following description.

Also in the following description referring to drawings, like reference numerals designate identical or corresponding parts throughout the several drawings.

There illustrated first is the case of quantization of component color image signals U and V obtained through the RCT operation, that is carried out linearly and also symmetrically to both of positive and negative data without considering U, V signal characteristics.

To be more specific, the present method of quantization is provided to be applicable to low frequency components which is obtained through the arithmetic average of color components for respective picture elements, when component color image signals are subjected to the frequency analysis by means of the wavelet transform, for example.

When the RGB components respectively have the value ranging from 0 to 255, the value of the color signals U and V ranges accordingly from −255 to 255 (9 bits). The quantization of these color signals U and V into 256 levels (8 bits), for example, may be carried out according to the linear quantization scheme shown in Table 1.

TABLE 1

| U or V | Quantized value | Decoded value |
|---|---|---|
| 255 | 127 | 254 |
| 254 | 127 | 254 |
| 253 | 126 | 252 |
| 252 | 126 | 252 |
| .... | .... | .... |
| 3 | 1 | 2 |
| 2 | 1 | 2 |
| 1 | 0 | 0 |
| 0 | 0 | 0 |
| −1 | −1 | −2 |
| −2 | −1 | −2 |
| .... | .... | .... |
| −252 | −126 | −252 |
| −253 | −126 | −252 |
| −254 | −127 | −254 |
| −255 | −127 | −254 |

On performing the inverse RCT transform onto the thus quantized color signals U and V, decoded R'G'B' components are obtained. It is likely to result in errors between the components R'G'B' and original RGB. The errors may be perceived by human eyes as the error or deviation in color, that is known, for example, as a color difference in the Lab space, which is referred to hereinafter as 'Lab color difference'.

When the degree of quantization (or compression) is relatively small as illustrated in Table 1, the resultant error in color is small so as often not to be perceived by eyes. With the increase in the degree of the quantization, however, the magnitude of the error reaches to the level to be well recognized, thereby causing practical disadvantages.

There detailed in the present disclosure are the systems and methods to be utilized for alleviating the above noted disadvantages, being capable of providing reproduced color images with a sufficient fidelity to original images, even when the quantization of color image signals is carried out with an increased degree of the compression.

As an illustrative embodiment, the construction and operation of an image processing system is detailed herein below.

Figure 7:
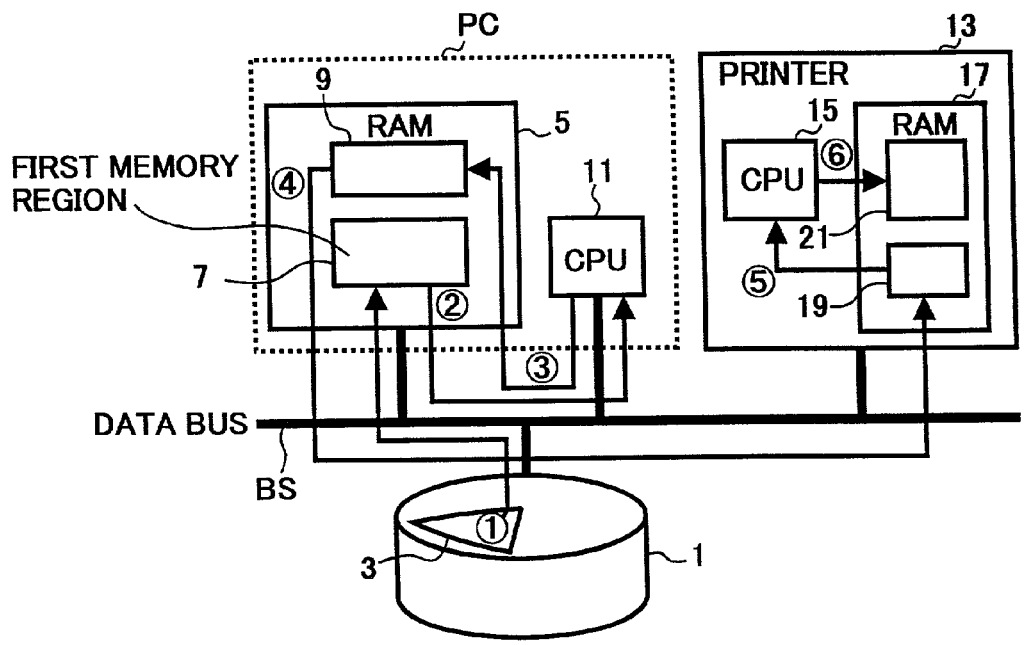
FIG. 7 is a schematic diagram illustrating the construction and operation of an image processing system according to one embodiment disclosed herein.

FIG. 7 is a schematic diagram illustrating the construction and operation of the image processing system.

Referring to FIG. 7, the image processing system disclosed herein includes at least a hard disk 1, a data bus BS, a personal computer PC and a printer 13. The hard disk 1 includes a first memory region 3. The personal computer PC includes a random access memory (RAM) 5 provided with another first and a second memory regions 7 and 9, and a central processing unit (CPU) 11. In addition, the printer 13 includes a further CPU 15 and RAM 17 provided with a further first and second memory regions 19 and 21.

The hard disk 1, RAM 5, CPU 11 and printer 13 are respectively connected to the data bus BS. In addition, the first and second memory regions 19 and 21 in the RAM 17 are connected to the CPU 15.

In the thus constructed image processing system of FIG. 7, original color images stored in the first memory region 3 of hard disk 1 are written (①) into memory region 7 included in the RAM 5 by CPU 11.

The CPU 11 subsequently reads the portions of image data or signals written in memory region 7, and carries out quantization and compression steps (②) of the image signals according to the quantization method, which will be described later on. Further, the CPU 11 instructs to write (③) the thus compressed image signals into the second memory region 9 in the RAM 5.

Subsequently, the CPU 11 instructs to record (④) the compressed image signals, which are previously stored into the second memory region 9, into the first memory region 19 in the printer 13.

The CPU 15 included in the printer 13 then performs the decompression of the image signals (⑤) through the steps of reading the compressed image signals in the first memory region 19 and obtaining decoded values by retrospectively following the quantization steps. In addition, the CPU 15 instructs to write (⑥) the thus obtained decompressed image signals into the second memory region 21 in the RAM 17. The printer 13 subsequently prints out reproduced images according to the decompressed image signals through predetermined steps.

With the above described processing steps of color image signals, the amount of image data to be transmitted to the printer 13 can be reduced, thereby also decreasing the transmission time for the image data. As a result, even taking into consideration the time required for the compression and decompression of the data, high speed printing of color images becomes feasible with the steps disclosed herein.

Alternatively, the image processing system of FIG. 7 may also be operated as follows.

Figure 8:
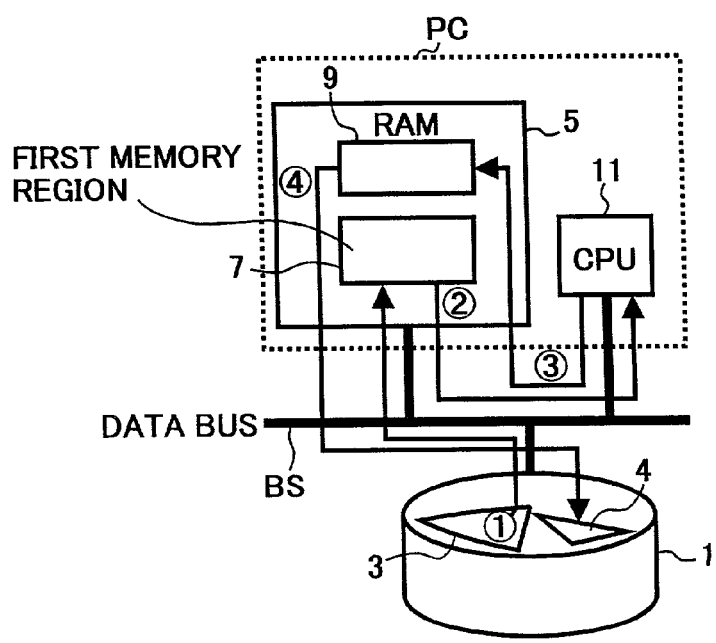
FIG. 8 is a schematic diagram illustrating an alternative operation of the color image processing system of FIG. 7.

Referring to FIG. 8, original images stored in the first memory region 3 of hard disk 1 are written (①) into memory region 7 included in the RAM 5 by CPU 11. The CPU 11 subsequently reads the portions of image signals written in memory region 7, and carries out quantization and compression steps (②) of the image signals according to the quantization method, which will be described herein below. Further, the CPU 11 instructs to write (③) the thus compressed image signals into the second memory region 9 in the RAM 5.

Upon the completion of compressing all original image data through the above noted steps, the CPU 11 instructs to record (④) the compressed data in a second memory region 4 included in hard disk 1.

The above noted quantization method will be detailed herein below according to one embodiment disclosed herein.

Since the signal transformation is performed to decorrelate the RGB components, as indicated earlier, it is preferable through the compression steps to examine the characteristics of the respective component color image signals resulted from the RTC transform. Although such an examination on the component signals may not always be necessary for the case of relatively low degree of compression, it becomes requisite with either the increase in the degree of compression, or with the demands for higher image quality by means of the data decompression, among others.

In the quantization method disclosed herein, the quantization of the component color signals U and V is carried out such that a color difference cannot be recognized when viewed at a predetermined distance from a picture image, that is, the chromatological color difference which is exemplified by the known Lab or LUV color difference, is less than a predetermined value.

In the case of the RCT transform, for example, Lab color differences per unit quantization error are obtained for the respective color signals U and V. The number of appropriate quantization level is subsequently determined for the respective color signals U and V, respectively, such that the Lab color differences per unit quantization error remains less than the predetermined value.

Incidentally, by the term 'quantization error' is meant the error of color signals, which is caused through the quantization steps, i.e., the difference in decompressed color signals with respect to the original color signals prior to the quantization.

Figure 9:
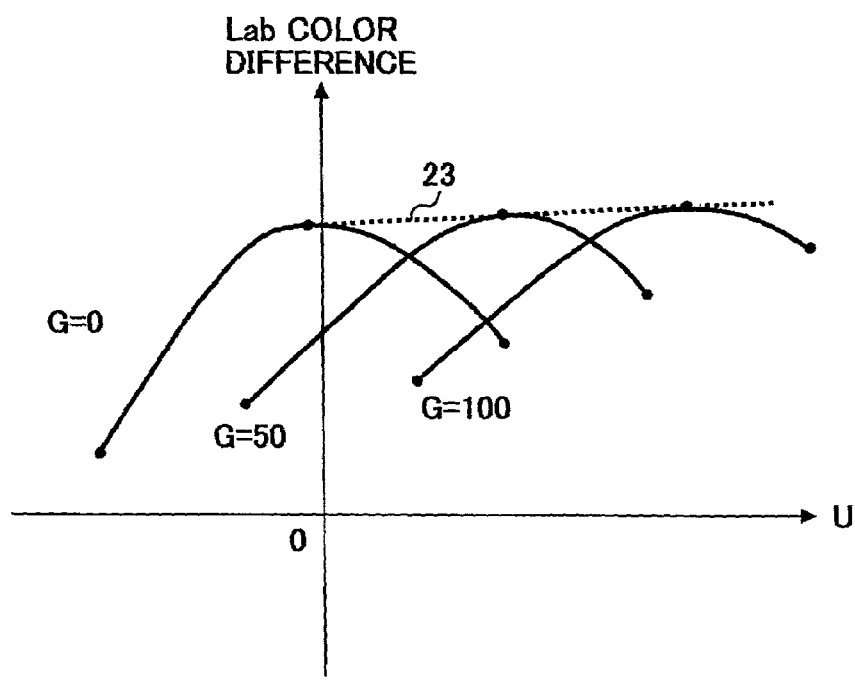
FIG. 9 is a schematic drawing of FIG. 2, illustrating the change in the Lab color difference with the color signal U.

The Lab color difference per unit quantization error, i.e., Lab color difference/($\Delta U$ or $\Delta V$), changes with the value of G component included in the image signals, as shown in FIG. 9 which is obtained as a schematic drawing of FIG. 2.

An envelope 23 can be drawn as shown in FIG. 9 through maximal points of curves which are each a function of a variable, the component color signal U in this case, corresponding to respective G component values. This envelope 23 may be taken as a curve which represents the change of color difference with the variable U or V.

Figure 10:
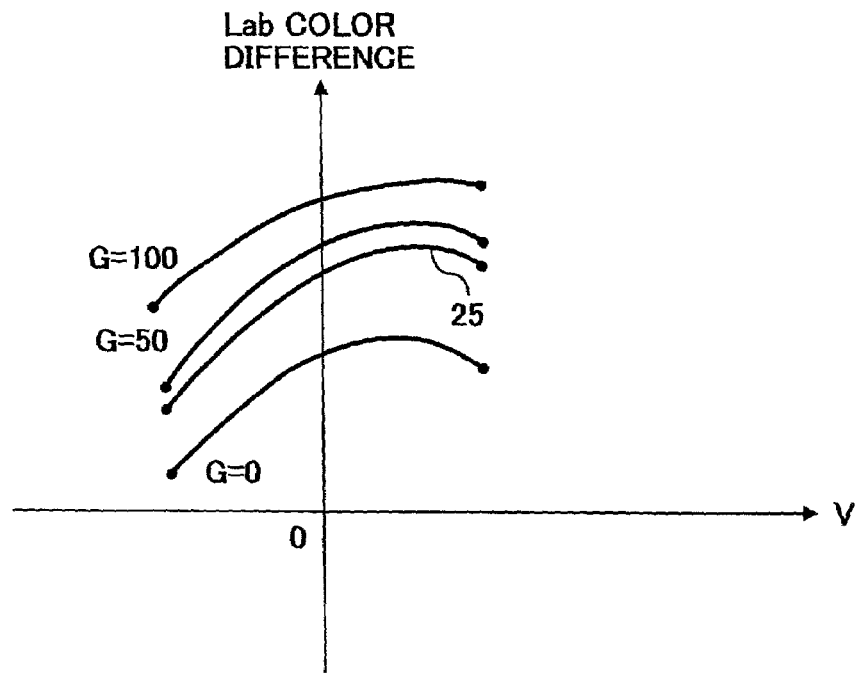
FIG. 10 is a schematic drawing of FIG. 1, illustrating the change in the Lab color difference with the color signal V.

Also during the quantization steps, the average of the Lab color differences over all G components may alternatively be taken in place of the envelope 23. Further, the average of the color differences for principal G component values such as, for example, 0, 50, and 100, may alternatively be adopted. The resulting averaged curve is shown as the curve 25 in FIG. 10 which is obtained as a schematic drawing of FIG. 1.

Figure 11A:
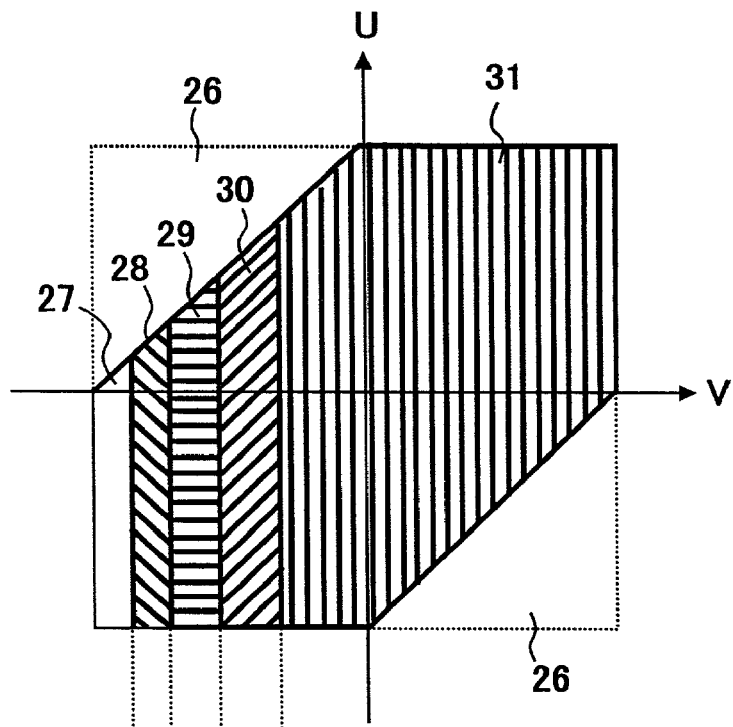
FIG. 11A includes a contour map of the Lab color differences per unit quantization error on the U versus V plane.
Figure 11B:
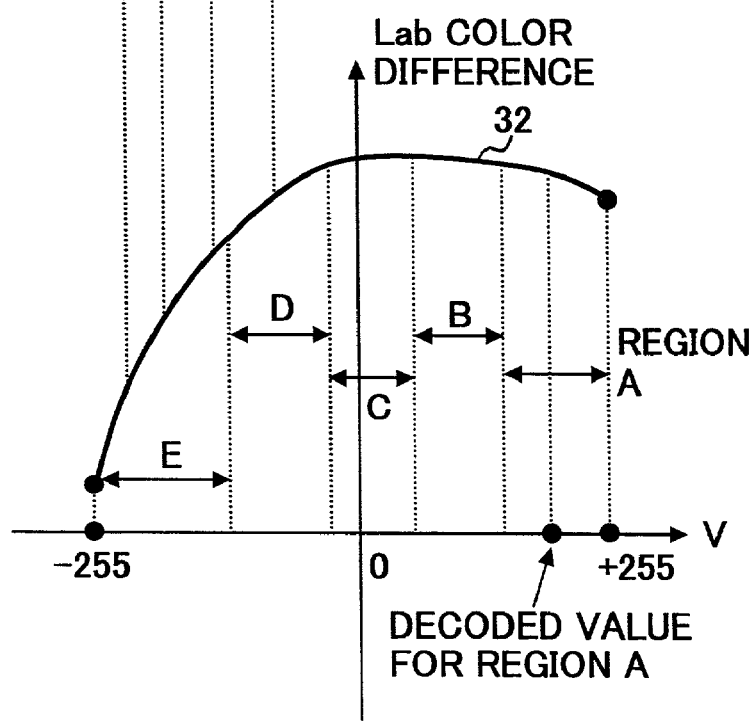
FIG. 11B is a cross-sectional view taken along the V axis of the contour map of FIG. 11A.

FIGS. 11A and 11B contain drawings illustrating color differences resulted from the quantization error related to the component color signal V.

FIG. 11A is a contour map of the Lab color differences per unit quantization error on the U vs. V color signal plane, in which the color differences are related to component color signals V and obtained according to the above described averaging over principal G component values, and FIG. 11B is a cross-sectional view taken along the V axis of the contour map of FIG. 11A.

The drawings FIGS. 11A and 11B are prepared as follows. The V component color signals are obtained as the difference between components B and G, or the components B minus G, as indicated earlier.

First, an assumption is made, in that a color signal changes from V to V+$\Delta V$ with the G component fixed, that is, the change $\Delta V$ in the B component alone among the RGB components is assumed to be caused by the quantization error through decoding steps. In addition, the color space of the above noted RGB signal (i.e., so-called input profile of the signal) is assumed to be appropriately represented by the standard RGB space. The coordinates of the RGB signal are then transformed into those in the Lab space by the known transformation methods.

The coordinates of another RGB signal are obtained in a similar manner. That is, for an RGB signal with its B component increased by $\Delta V$, the coordinates thereof are transformed into those in the L'a'b' space. As a result, the Lab color difference can be obtained between the original and decoded color signals.

Further, by changing R and B components with the G component fixed, there can be obtained the Lab color difference per quantization error $\Delta V$ related to color signals V on the UV plane.

It is apparent from the above description that the color differences vary with the value of G component as a parameter, and that the change in the color difference in terms of the parameter G component can also be obtained through the transformation other than the RCT transform. In addition, another Lab color difference caused by quantization error $\Delta U$ can be obtained in a similar manner, in which the error $\Delta U$ is related to the color signals U, or the component R minus G, as indicted earlier.

Referring again to FIG. 11A, the average of the Lab color difference/$\Delta V$ in the region 27 is found smallest, and increases gradually through the regions 28 through 31. In addition, no value of either component color signal U or V is found in the regions 26.

As shown in FIG. 11B, the magnitude of the color difference is practically represented by the area under the curve.

According to one embodiment disclosed herein, the present quantization method is provided such that the whole region under the curve 32 is divided into a plurality of regions (from regions A through E in FIG. 11B) over the range of component color signal V from −255 to +255, and that the area of each of the thus divided regions remain no greater than a predetermined value, respectively.

The number of the thus divided regions is hereinafter referred to as quantization level number. In addition, a quantization threshold value is determined by the value of the color signals V, for example, at which the change in the quantization level number takes place, as exemplified herein below.

Incidentally, it is noted that the decoded value is represented by the value at the median of respective regions (FIG. 11B) for the component color signal V, for example.

Although the change in the Lab color difference is asymmetric with respect to the sign of the component color signal V, as shown in FIG. 11B, it should be noted that the quantization according to the present method can be carried out unaffected by such asymmetry in the color signal change. As a result, the deviation in color images, which is possibly perceived by eyes, can be reduced.

In the case of the quantization level number of 23, for example, quantization steps are performed for the divided regions affixed with 5-bits encoded data.

However, the data length may be reduced to be less than 5 bits, as follows: Taking signal characteristics into consideration regarding V and U component signals, dividing the range of color signal into a plurality of regions such that the area of divided regions remain no greater than a predetermined value, as described just above, and then deciding the quantization threshold value according to the above noted division of the color signal range.

To be more specific, for the Lab color difference per quantization error $\Delta V$ such as shown in FIGS. 11A and 11B, the ratio of the Lab difference for a certain positive V to that for negative V (i.e., V's being same in magnitude but opposite in sign), may be regarded as approximately 2 to 1.

In such a case, the positive V range is divided into 16 regions, while the negative V range into 8 regions. Following the steps described earlier, the values in the negative V range are then quantized by means of 4-bits data with 1-bit already included for distinguishing the polarity. In a similar manner, the values in the positive V range inclusive of the origin are quantized by means of 5-bits data with 1-bit included for distinguishing the polarity.

In this case, therefore, component color signals can be quantized with data of 4.5-bits in average, while retaining the Lab color difference still within a predetermined value.

This improvement in quantization efficiency becomes feasible according to the following steps. Namely, taking first the signal characteristics of Lab color difference into consideration, subsequently deciding a quantization threshold value to be a certain value of V which corresponds to the maximum of the Lab color difference per quantization error $\Delta V$ (i.e., V=0 in the present FIG. 11B case), and then assigning different quantization level numbers, one for each of the V ranges specified by the quantization threshold value (i.e., one quantization level number for the range smaller, and the other for the range larger, than the threshold value, respectively).

It is noted herein that the maximum of the Lab color difference per unit quantization error is often found at, or in the vicinity of, the point at which the polarity of the color signal changes.

Therefore, the quantization threshold value which is utilized for assigning the different quantization level numbers, as described above, may be decided as to correspond to the polarity change.

As described herein above, the range of component color signal V from −255 to +255 is quantized in a non-linear fashion in general using a table containing the quantization threshold value.

Alternatively, by taking the signal characteristics of Lab color difference into consideration for the quantization, the color signal values in the negative V range may be quantized non-linearly by 4-bits data with 1-bit included for distinguishing the polarity, while the values in the range of 0 or positive V may be quantized linearly by 5-bits data.

Namely, the above quantization steps for the values in the range of 0 or positive V can be achieved without consulting the table. Since the table is generally stored in a memory beforehand, the above described linear quantization steps without the table facilitate for saving memory area otherwise needed for the quantization.

Incidentally, the linear quantization such as mentioned above can suitably be adopted particularly to the color signal values in the ranges, in which the Lab color difference per unit quantization error is regarded at least approximately constant, thereby achieving the quantization with relative ease and retaining the Lab color difference within a predetermined value.

There described so far are primarily on the color signals V and their signal characteristics with respect to the Lab color difference. When the component color signal U is examined, signal characteristics with respect to the Lab color are different from those of the color signal V.

Figure 12:
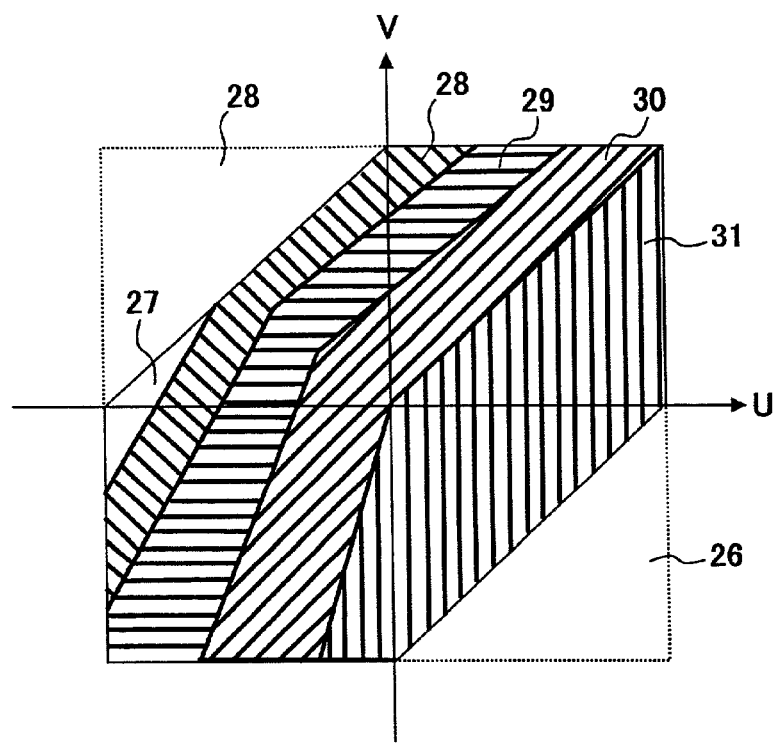
FIG. 12 includes a contour map of the Lab color difference caused by quantization error of the color signal U.

FIG. 12 is a contour map of the Lab color differences caused by quantization error of color signals U, which corresponds to the previous map of FIG. 11A related to the color signal V.

FIG. 12 herein shows a contour map of the Lab color differences per unit quantization error $\Delta U$ on the U vs. V color signal plane, in which the color differences are obtained by averaging over principal G component values, in a similar manner to that described earlier. In addition, FIG. 13 is a cross-sectional view taken along the U axis of the contour map of FIG. 12.

Figure 13:
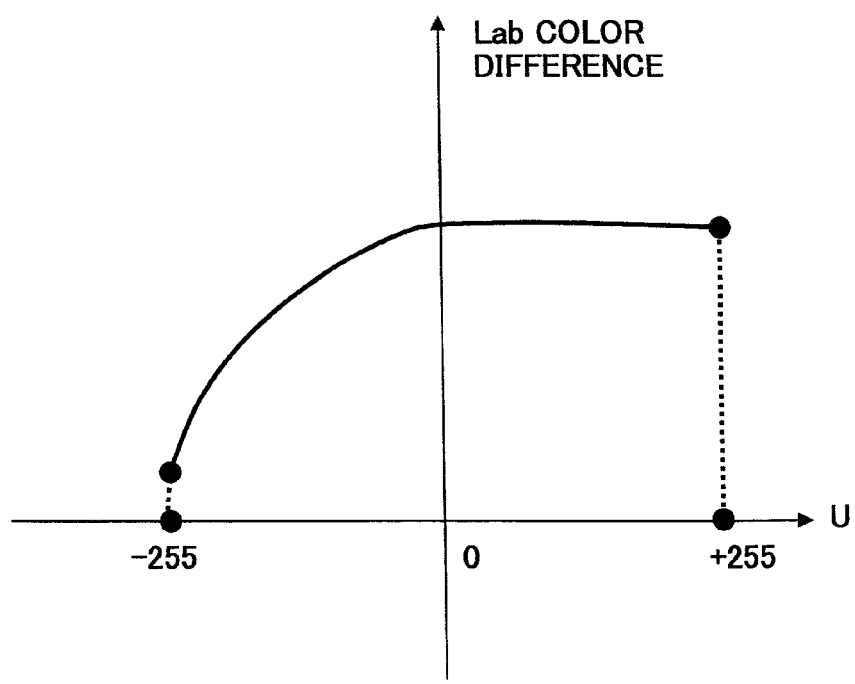
FIG. 13 is a cross-sectional view taken along the U axis of the contour map of FIG. 12.

Although the change in the Lab color difference per unit quantization error is dependent on the color signal U, as shown in FIG. 13, the range of color signal U from −255 to +255 may be quantized as follows.

Namely, the color signal values in the negative U range are quantized by means of 4-bits data with 1-bit already included for distinguishing the polarity, while the values in the positive U range inclusive of the origin are quantized by means of 5-bits data with 1-bit included for distinguishing the polarity, thereby improving quantization efficiency for the color signal U, as well.

Alternatively, the above quantization steps related to the component color signal U may also be carried out as follows, in similar manner to that described earlier for the signals U, in which the values of the color signal U in the negative U range may be quantized non-linearly by 4-bits data with 1-bit included for distinguishing the polarity, while the values in the range of 0 or positive V may be quantized linearly by 5-bits data again with 1-bit included for distinguishing the polarity.

Therefore, it is quite evident from the foregoing description that the method disclosed herein is quite effective for quantizing both U and V color signals and especially suitable for use in the RCT transform.

When both contour maps in FIGS. 11A and 12 are compared each other assuming the same scale for respective axes, it is found the Lab color difference per quantization error $\Delta V$ related to the color signal V is larger on the whole than that related to signals U.

Since the magnitude of the color difference is represented by the area under the curve in respective curves, as described earlier, it is appropriate and also effective to assign quantum level numbers different each other for respective signals U and V, to thereby be able to retain the areas under the respective curves within a predetermined value.

This can be achieved as follows. First, for the quantization of color signals V, the V range is divided into a relatively large number of regions each having a smaller width, corresponding to a larger quantization level number based on the signal characteristics consideration. Subsequently comparing to thus decided number of regions, the U color signal range is divided into a smaller number of regions each having a larger width, and a quantization level number for the color signal U is determined to be smaller, than that for the V signals.

As a result, the magnitude of errors caused by the color signal quantization can be made uniform over the entire area of the color image according to the method disclosed herein, to thereby facilitate to achieve satisfactory image quality after decompression.

Although the method and processing steps have been described so far on the Lab color differences, color differences in the CIE Lab space may alternatively be utilized. In addition, the Lab color difference is generally known as one of the indicators which is able of expressing quantitatively the difference in the color actually perceived by human eyes, and reflecting quite well the difference in psychological response to the color difference. Moreover, the Lab color difference can be computed with relative ease.

Therefore, according the embodiment disclosed herein, it is shown that the present method and process steps included therein are quite appropriate to successfully be adopted for the quantization of the color signals, that are able to reflect the characteristics of human perception quite satisfactorily.

Although the Lab color difference is characteristic in its relative simplicity and ease in use, as indicated just above, the modified CIE Lab color difference may alternatively be used to reflect the human visual perception more thoroughly depending on use during the quantization.

The method and process steps of color image processing will be exemplified in detail herein below.

Figure 14:
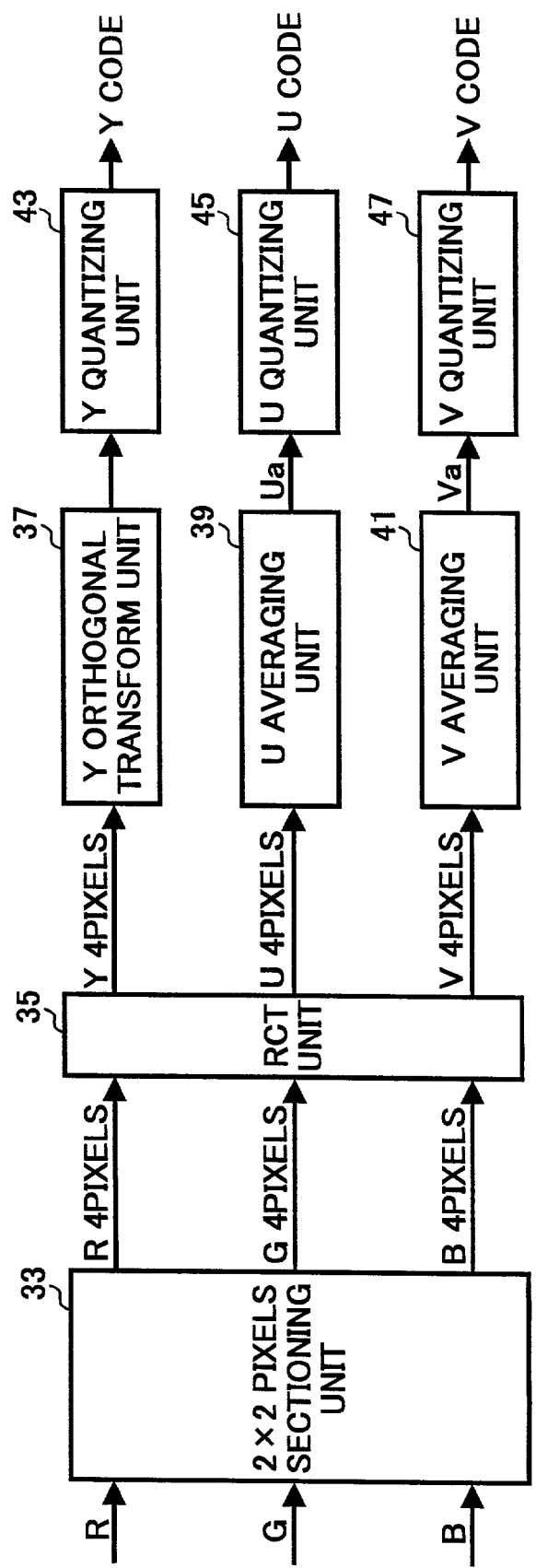
FIG. 14 includes a block diagram of the major portions of the CPU 11 of FIGS. 7 and 8 according to one embodiment disclosed herein.

FIG. 14 is a block diagram of the major portions of the CPU 11 of FIGS. 7 and 8 according to one embodiment disclosed herein.

Referring to FIG. 14, the CPU 11 includes at least a 2×2 sectioning unit 33, RCT unit 35, Y orthogonal transform unit 37, U averaging unit 39, V averaging unit 41, Y quantizing unit 43, U quantizing unit 45 and V quantizing unit 47.

Into the 2×2 sectioning unit 33, color image signals are input, which include RGB components with the values ranging from 0 to 255 (8 bits), and the R, G, and B components thereof are respectively sectioned into the units of four pixels to subsequently be fed to the RCT unit 35.

The RCT unit 35 then performs RCT steps on the R, G, and B components to subsequently feed, by the units of four pixels, the thus transformed signals Y to the Y orthogonal transform unit 37, color signals U and V to the averaging units 39 and 41, respectively.

Subsequently, the Y orthogonal transform unit 37 performs on the thus fed signals the orthogonal transformation by means of the discrete cosine transform or Haar transform, and the resultant signals are fed to the Y quantizing unit 43. In addition, the U averaging unit 39 operates to compute the average Ua of the signals which are fed as above, and the resultant average is then supplied to the U quantizing unit 45. Similarly, the V averaging unit 41 computes the average Va, and the resultant average is subsequently supplied to the V quantizing unit 47.

It is worth noting that the quantization steps disclosed herein may be performed also on low frequency components which are obtained by the orthogonal transformation.

Subsequently, the Y signals subjected to the orthogonal transformation as above are quantized (or encoded) by the Y quantizing unit 43. The average Ua, which is previously obtained each in the units of four pixels is quantized or encoded by the U quantizing unit 45. The average Va is similarly quantized by the V quantizing unit 47.

Figure 15:
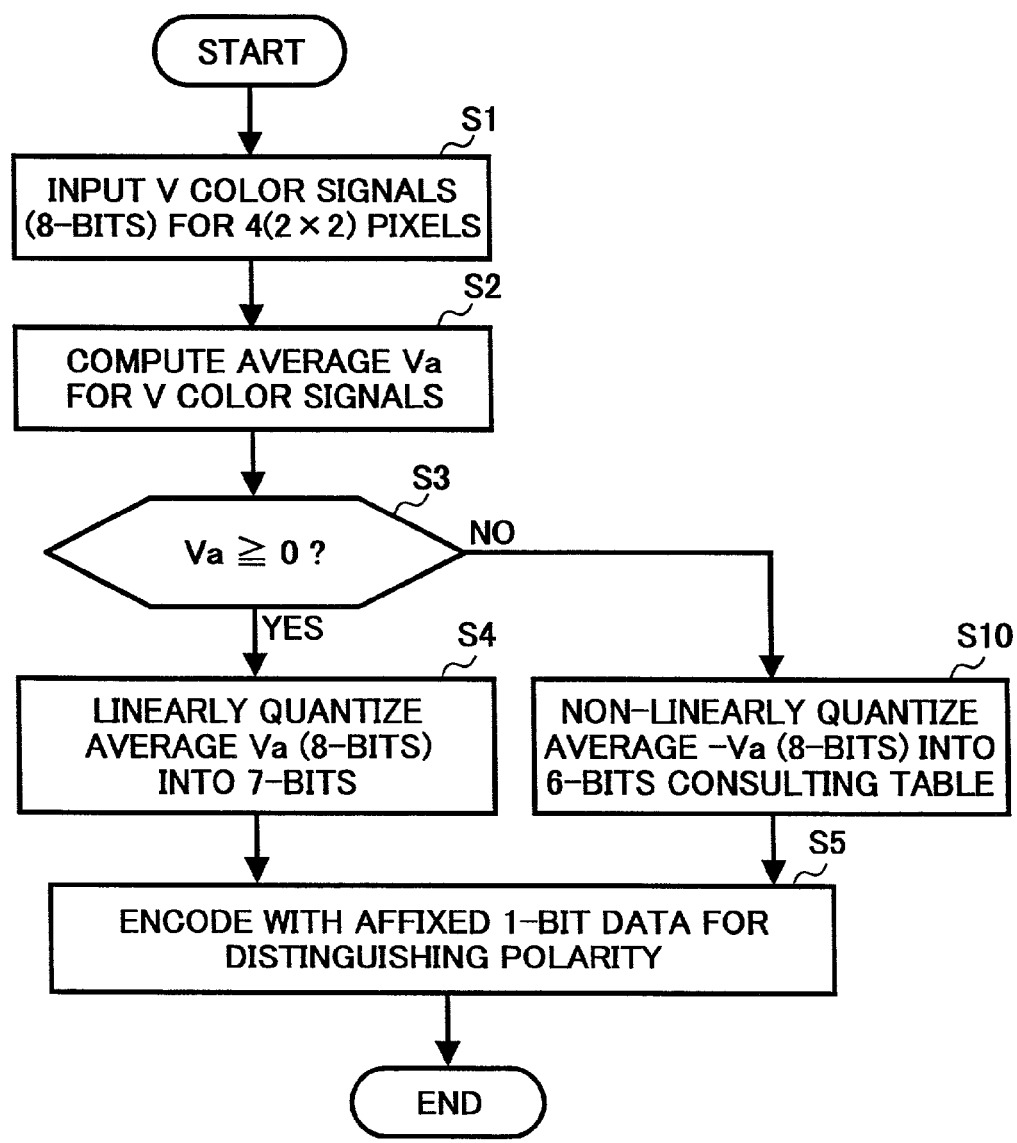
FIG. 15 includes a flow chart illustrating quantization process steps for V color signals according to one embodiment disclosed herein.

FIG. 15 is a flow chart illustrating quantization process steps for the color signal V, which are shown in FIG. 14. Referring to FIG. 15, the process begins in step S1 where 8-bits V color signals are input for 4 picture elements of 2×2. The average Va of the 8-bits V color signals is then computed in step S2.

After completing Step 2, an inquiry is made in step S3 regarding whether the thus obtained average Va is equal to, or greater than zero. If the response to the inquiry is affirmative, the process proceeds to step S4. However, if the response is negative, the process proceeds to step S10.

In step S4 the 8-bits average Va is linearly quantized into 7-bits data by dividing by 2. In step 10, by contrast, the 8-bits average −Va (or |Va|), which assumes the value ranging from 0 to 255, is non-linearly quantized into 6-bits data which is one half of the 7 bits, according to the following Table 2 prepared for defining quantization threshold values.

TABLE 2

| Va | Qauntized value |
|---|---|
| 0 | 0 |
| 1 | 1 |
| 2 | 2 |
| 3 | 2 |
| 4 | 3 |
| 5 | 3 |
| 6 | 3 |
| 7 | 4 |
| 8 | 4 |
| 9 | 4 |
| 10 | 5 |
| 11 | 5 |
| 12 | 5 |
| 13 | 6 |
| 14 | 6 |
| 15 | 6 |
| 16 | 7 |
| 17 | 7 |
| 18 | 7 |
| 19 | 8 |
| 20 | 8 |
| 21 | 8 |
| ... | ... |
| 243 | 62 |
| 244 | 63 |
| 245 | 63 |
| 246 | 63 |
| 247 | 63 |
| 248 | 63 |
| 249 | 63 |
| 250 | 63 |
| 251 | 63 |
| 252 | 63 |
| 253 | 63 |
| 254 | 63 |
| 255 | 63 |

It is noted herein that the maximum of the Lab color difference per unit quantization error of the average Va is found in the vicinity of the origin '0', and that the quantization level number is appropriately varied to correspond to the polarity change of the Va average.

In step S5, a one-bit encoded data is affixed as a prefixed bit to the quantized average |Va| obtained previously in either step S4 or S10, to be utilized for distinguishing the polarity of the color signals V in later decoding steps, and then the quantization steps end for the color signal V.

Figure 16:
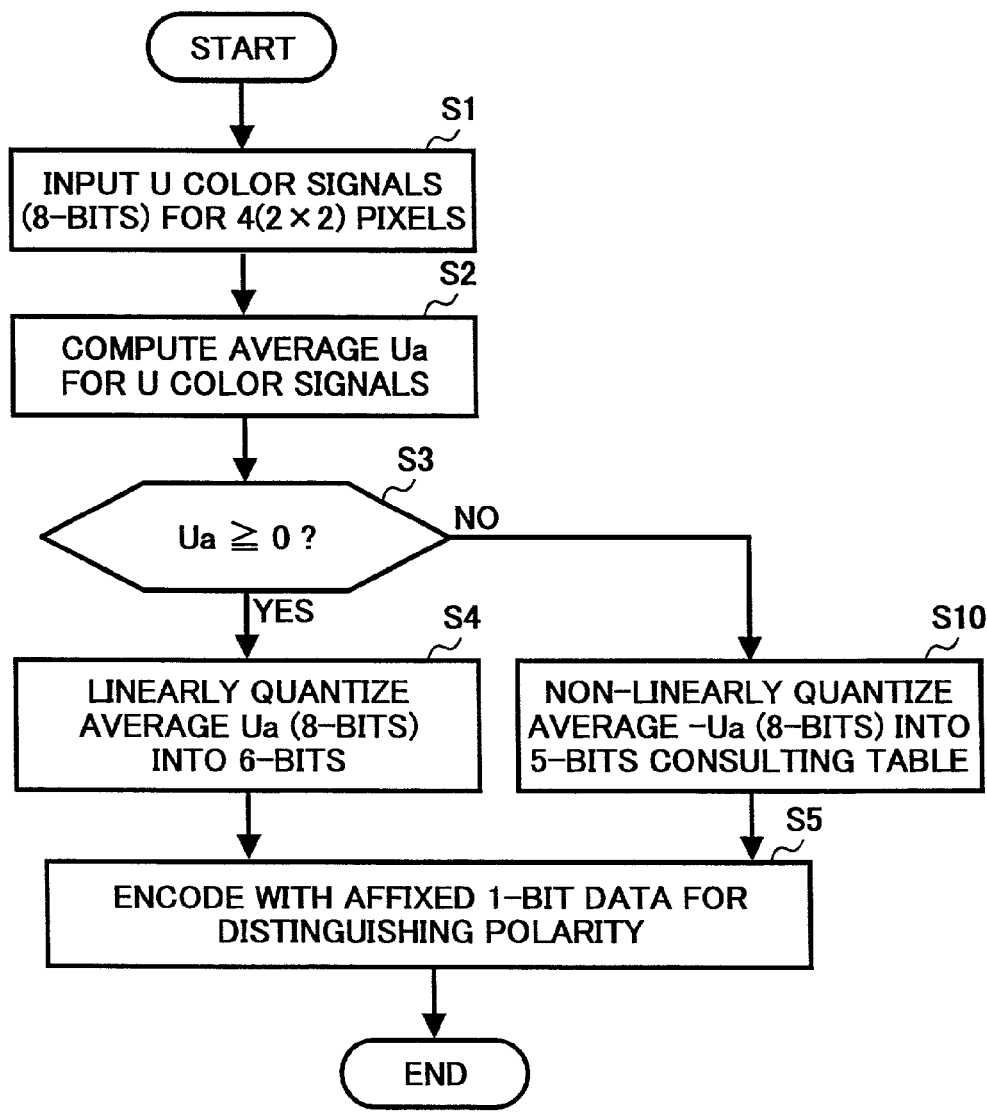
FIG. 16 includes a flow chart illustrating quantization process steps for U color signals according to one embodiment disclosed herein.

FIG. 16 is a flow chart illustrating quantization process steps for the color signal U.

Referring to FIG. 16, the process begins in step S1, where 8-bits color signals U are input for 4 picture elements of 2×2. The average Ua of the 8-bit color signals U is then computed in step S2.

After completing step S2, an inquiry is made in step S3 regarding whether the thus obtained average Ua is equal to, or greater than zero. If the response to the inquiry is affirmative, the process proceeds to step S4. However, if the response is negative, the process proceeds to step S10.

Subsequently in step S4, the 8-bits average Va is linearly quantized into 6-bits data by dividing by 4. In step 10, by contrast, the 8-bits average –Ua (or |Ua|), which assumes the value ranging from 0 to 255, is non-linearly quantized into 5-bits data.

It is noted herein that the maximum of the Lab color difference per unit quantization error of the average Ua is found in the vicinity of the origin '0', and that the quantization level number may appropriately be varied so as to correspond to the polarity change of the Ua average. In addition, the quantization level number is smaller for the Ua average than that for the Va average, regardless of the polarity of the Ua average, as mentioned above.

In step S5, a one-bit encoded data is affixed as a prefixed bit to the quantized average |Ua| obtained previously in either step S4 or S10, to be utilized for distinguishing the polarity of the color signal U in later decoding steps, and the quantization steps end for the color signal U.

The method and process steps of computing the color difference Lab will be detailed herein below.

Figure 17:
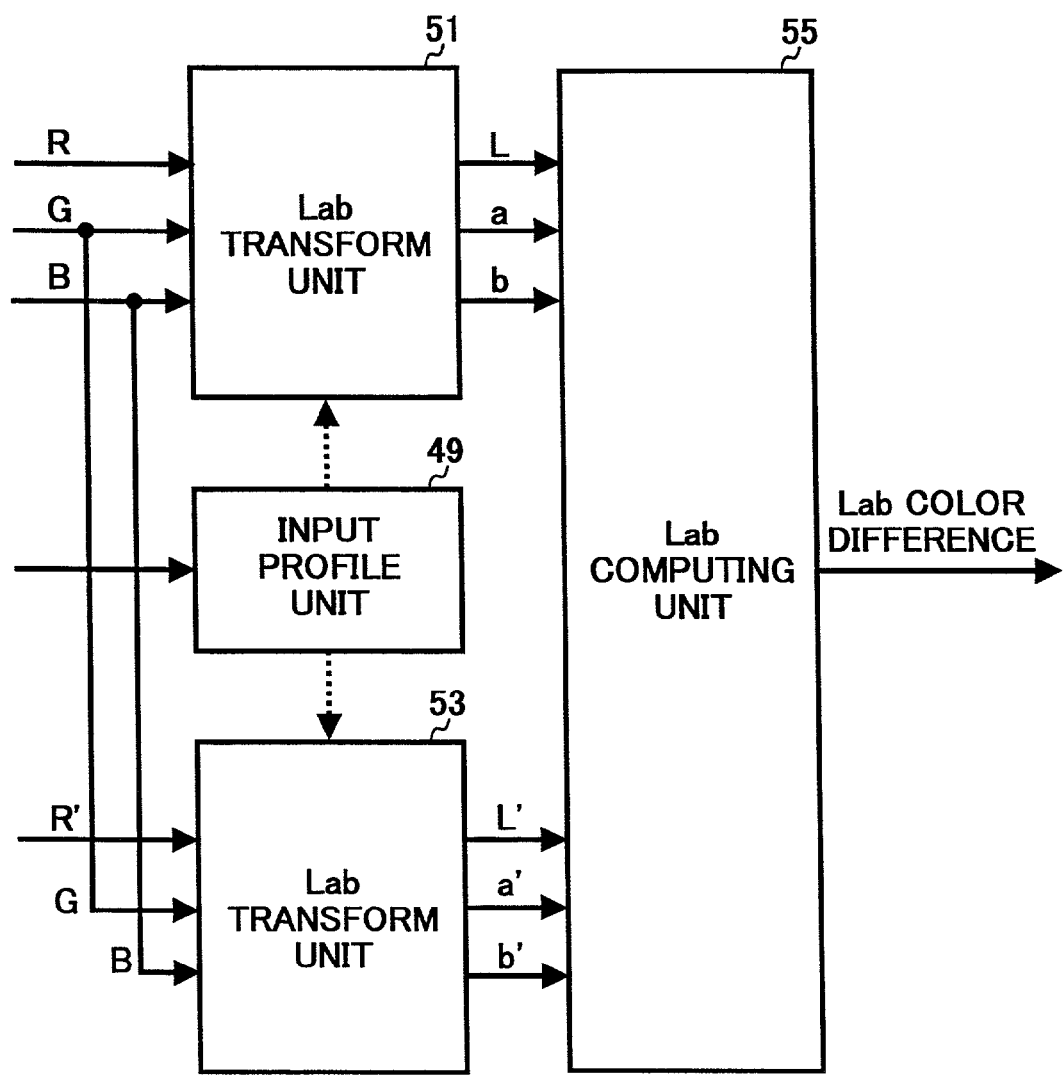
FIG. 17 includes a block diagram of the major portions of the CPU 11 of FIGS. 7 and 8 according to one embodiment disclosed herein.

FIG. 17 includes a block diagram of the major portions of the CPU 11 of FIGS. 7 and 8 according to one embodiment disclosed herein. Referring to FIG. 17, the CPU 11 includes at least Lab transform units 51 and 53, input profile unit 49 and Lab color difference computing unit 55.

Several pieces of information for specifying the present transformation are input to the Lab transform units 51 and 53 from the input profile unit 49. By 'input profile' is meant a table of parameters, which is used for transforming RGB components of the image signals into Lab components. According to the table, the Lab transform units 51 and 53 perform the transformation of the supplied RGB data into Lab components.

Referring to FIG. 17, the data D1 consisted of R, G and B components are fed to the Lab transform unit 51, and data D2 consisted of R', G and B components are fed to the Lab transform unit 53. The data D1 are then transformed to L, a and b components, and the data D2 are transformed to L', a' and b' components.

The components L, a, b, L', a' and b' are subsequently supplied to the Lab color difference computing unit 55, wherein the color difference ΔE* in the Lab space is obtained using the following relation $$\Delta E^* = \{(L-L')^2 + (a-a')^2 + (b-b')^2\}^{1/2}.$$

Although the Lab color difference is obtained with relative ease, the modified CIE Lab color difference ΔEm may alternatively be used to reflect the human perception more thoroughly, in which ΔEm is computed using the following relation with the values h, l and c being 0.75, 1.00 and 0.50, respectively.

$$\Delta Em = \{(h\Delta H^*)^2 + (l\Delta L^*)^2 + (c\Delta C^*)^2\}^{1/2},$$

where $\Delta H^* = \{(\Delta E^*)^2 - (\Delta L^*)^2 - (\Delta C^*)^2\}^{1/2}$, $\Delta L^* = L - L'$, and $\Delta C^* = \{a^2 + b^2\}^{1/2} - \{a'^2 + b'^2\}^{1/2}$.

According to the system and method disclosed herein, therefore, by changing the quantization threshold value appropriately corresponding to color signal ranges specified by the quantization threshold value at, or in vicinity of, the point of either the maximum of the color difference or color signal polarity change, the improvement in quantization efficiency becomes feasible through the aforementioned quantization steps based on the consideration of the asymmetry of the color signal dependence of color difference, to thereby be able to reproduce color images with reduced magnitude of errors caused by the signal quantization and satisfactory image quality after the signal decompression.

In another embodiment disclosed herein, a further method of quantization is disclosed to further improve the method, since the equalization level number for the color signal U may not be determined accurately in practice because of the dependence of color difference Lab on the color signal V, as shown in FIG. 12. In this method, the U versus V plane is divided into two regions depending on the magnitude of the color signals U and V, and the method of signal quantization is different in respective regions.

Again in this embodiment, the method of the quantization (i.e., both quantization level number and quantization threshold value) for one of the component color image signals, V or U, which is to be presently quantized, is varied depending on the value of other component color image signal which is not presently quantized.

To be more specific, first consider the plane defined by two color signals, as the variables, one to be quantized and the other not to be quantized. The plane is divided into two regions by the trajectory of maximal points of the color difference per unit quantization error for the color signal to be presently quantized, in which this trajectory is appropriately taken as the straight line, V=U, in the case shown in FIG. 12. The method is then adopted in the respective regions so as to be different in quantization parameters such as the quantization level number and quantization threshold value.

In addition, the color signal U may be quantized non-linearly using a table containing the quantization threshold value, when the color signal V is larger than U, while the signal U may be quantized linearly when V is smaller than U. The latter quantization steps can therefore be achieved without consulting a table, thereby being able to reduce memory area otherwise needed for the quantization.

In addition, in a similar manner to the first embodiment, the linear quantization such as mentioned above can appropriately be adopted particularly to the color signal values in the ranges, in which the Lab color difference per unit quantization error is regarded at least approximately constant.

Also in a similar manner to the first embodiment, by assigning a quantization level number smaller for the U color signal than that for the V signal, the magnitude of errors caused by the color signal quantization can be made uniform over the entire area of the color image, to thereby facilitate to achieve satisfactory image quality after decompression.

According to the present embodiment, an image signal processing system has a similar construction to that shown in FIG. 7, and the CPU 11 in the system includes similar units to those shown in FIG. 14.

Figure 18:
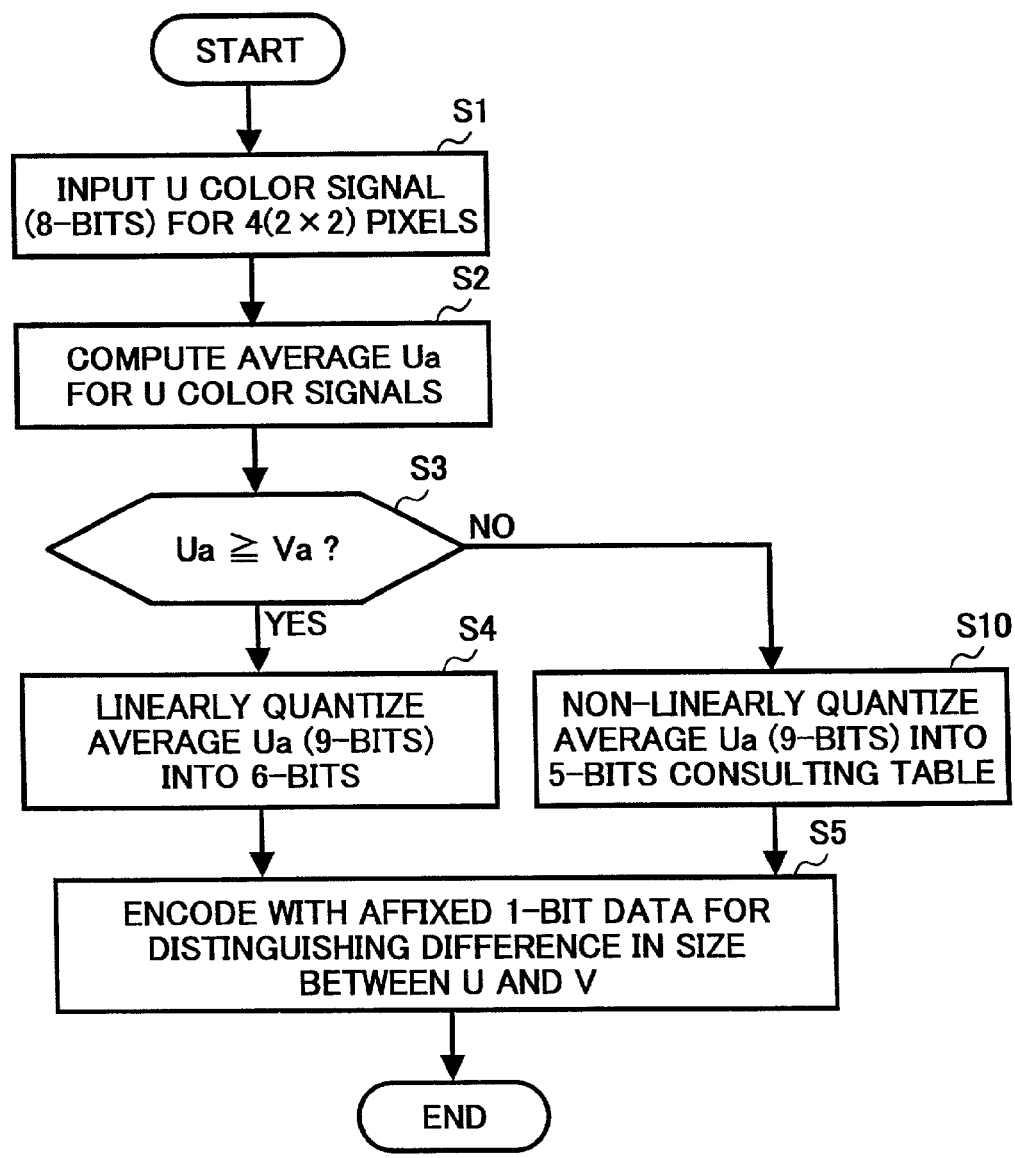
FIG. 18 includes a flow chart illustrating quantization process steps for U color signals according to a further embodiment disclosed herein.

Referring to a flow chart included in FIG. 18, quantization process steps for color signals V will be detailed herein below.

The process begins in step S1 where 8-bits U color signals are input for 4 picture elements of 2×2. The average Ua of the 8-bits U color signals is then computed by the U averaging unit 39 in step S2.

After completing Step 2, an inquiry is made in step S3 regarding whether the thus obtained average Ua is equal to, or greater than the average Va previously obtained by the V averaging unit 41. If the response to the inquiry is affirmative, the process proceeds to step S4. However, if the response is negative, i.e., the average Ua is smaller than the average Va, the process proceeds to step S10.

In step S4, since the color difference Lab caused by the quantization of the color signal U are large and constant in general, the 9-bits average Ua, which already includes 1-bit data for distinguishing the polarity, is quantized as follows: Retaining the sign as above, the absolute value of the average Ua (8-bits) is linearly quantized into 6-bits data by dividing by 4.

In step 10, by contrast, since the color difference Lab caused by the quantization of color signal U are small and non-linear, the 9-bits average Ua is quantized as follows. Namely, retaining its sign, the absolute value of the average Ua (8-bits) is non-linearly quantized into 5-bits data by consulting a table which dictates quantization threshold values.

In step S5, a one-bit encoded data is affixed as a prefixed bit to the quantized average |Ua| which is obtained previously in either step S4 or S10, to be utilized for distinguishing the polarity of the color signals U in later decoding steps, and the quantization steps end.

Incidentally, with the system and method for color image signal processing according the present embodiment, calculation and quantization steps of other variables such as the brightness signal Y, average Va and color difference Lab are carried out in a similar manner to the first embodiment.

Therefore, according to the system and method disclosed herein, the method of the quantization is varied for respective color signals, that is, one of the color signals, which are to be presently quantized, and for the other color signals which are not to be quantized presently, thus appropriately taking the characteristics of these color signals into consideration upon the quantization, the improvement in quantization efficiency becomes feasible, to thereby be able to reproduce color images with reduced magnitude of errors caused by the signal quantization and with satisfactory image quality after the decompression.

In still another embodiment disclosed herein, a further method of quantization is disclosed to further improve the method.

When signal characteristics of Lab color difference resulted from the quantization of the color signals U and V are considered in this method, a further method may be provided, in which both the color signal V and the distance L, inclusive of its sign, of a point on the V versus U plane from the straight line, V=U, are subjected to the quantization.

Figure 19:
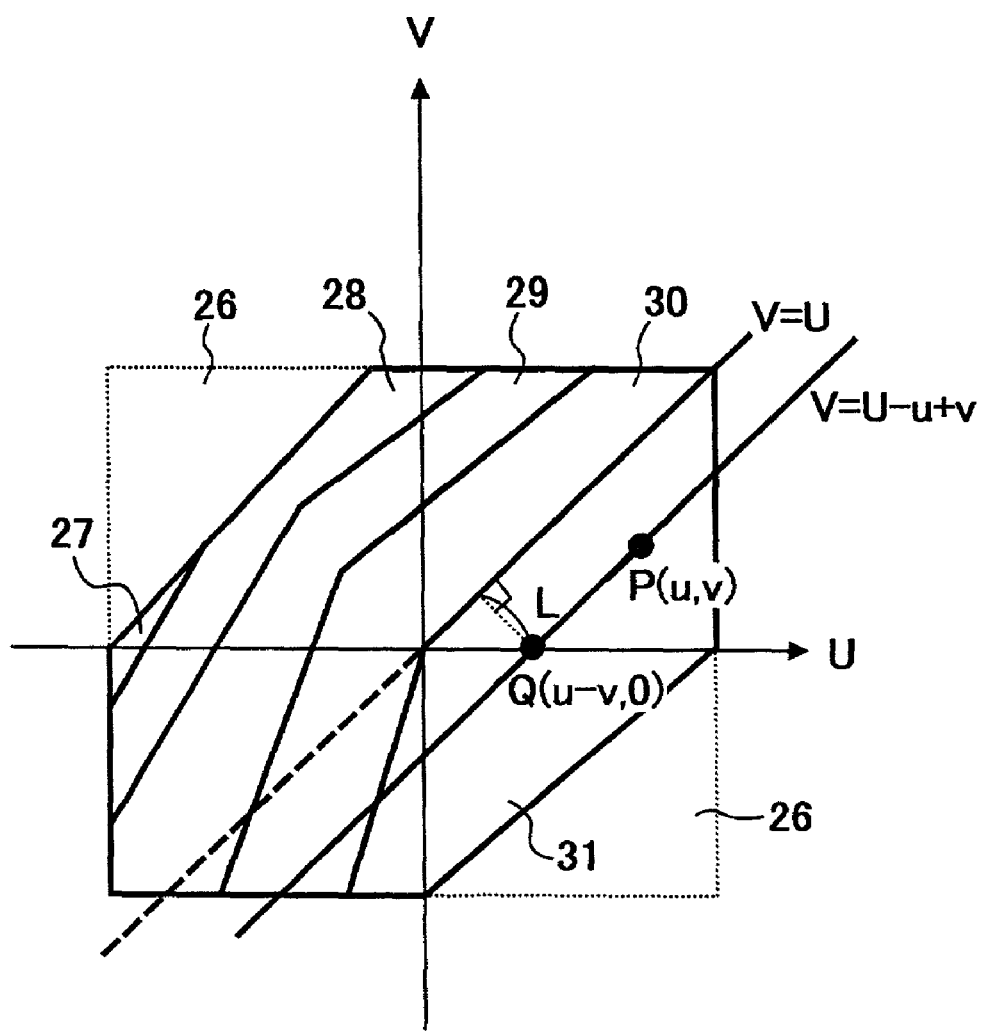
FIG. 19 includes a drawing on the U versus V plane illustrating the relation between the color difference Lab and color signals U and V.

To be more specific, it is shown in FIG. 19 that the color difference Lab caused by the quantization error of color signal U is generally dependent on the distance from the straight line, V=U, but not so much dependent on the value itself of either the color signal U or V. Therefore, by quantizing the distance from the straight line, V=U, in inclusive of its sign, the quantum level number and threshold value can be determined such that the characteristics of the Lab color difference are appropriately taken into consideration.

Incidentally, by decoding the thus quantized color signal V and distance L in inclusive of its sign, there decoded are color signals U and V, and further RGB components, accordingly. In addition, the present method of quantization is suitably applied not only to RCT, but also to other color signal transformations, as well.

In the above-mentioned method of quantizing the distance in inclusive of its sign, however, the encoding of the distance L itself is rather complicated. This complication may be alleviated by alternatively adopting a quantity which is equivalent to the distance L, as follows. For example, a point P(u, v) is assumed on the UV plane as shown in FIG. 19, and a straight line is drawn having a gradient of 1 (one) and passing through the point P, which is expressed by V=U−u+v. Also shown in the figure, the straight line intersects the U-axis at point Q (u−v, 0), in which the value (u−v) is found equal to $2^{1/2}$ times the distance L.

Accordingly, the difference between the color signals u and v, or the value (u−v), may suitably be taken as the parameter to be quantized.

Also in the present embodiment, in the similar manner to the previouds embodiment, the color signal U may be quantized non-linearly using a table containing the quantization threshold value, when the difference, u−v, is smaller than zero, while the signal U may be quantized linearly when the difference is larger than, or equal to zero.

In addition, since the Lab color difference per quantization error ΔV caused by the quantization of color signals V is larger on the whole than that caused by the signals U, in a similar manner to the previous embodiment, the quantization level number may preferably taken to be larger for the V color signal the level number for the difference (u−v).

According to the present embodiment, a color image processing system has a similar construction to that shown in FIG. 7, and the CPU 11 in the system includes similar units to those of FIG. 14.

Figure 20:
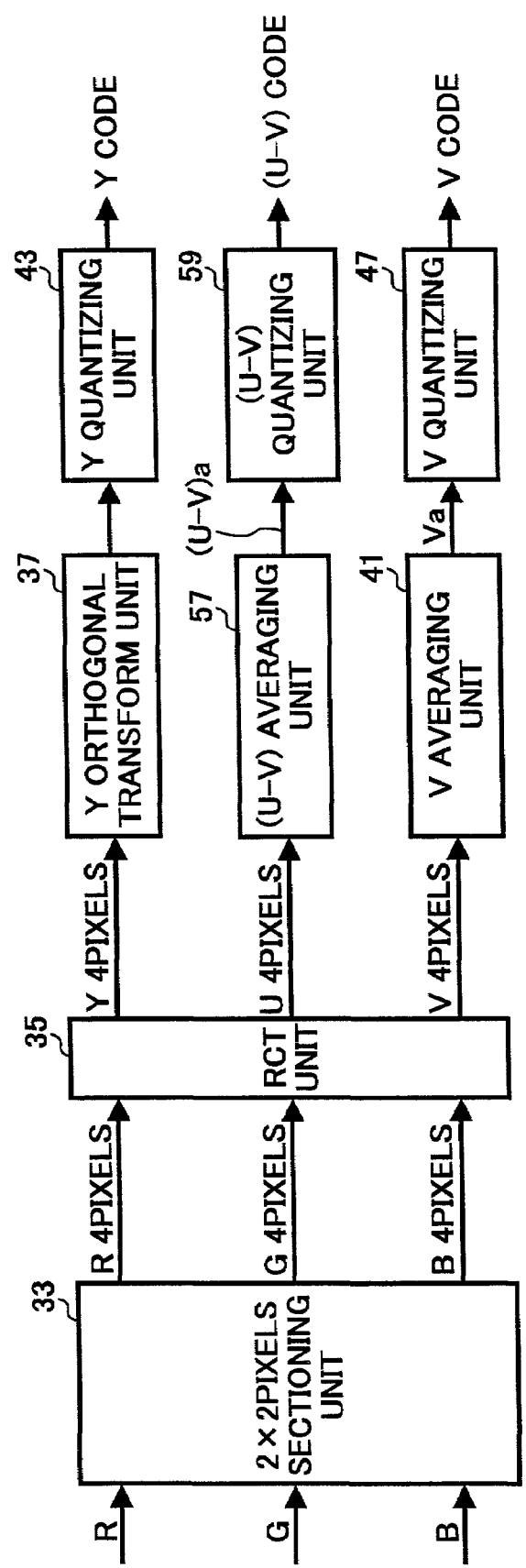
FIG. 20 includes a block diagram of the major portions of the CPU 11 of FIGS. 7 and 8 according to still another embodiment disclosed herein.

Referring now to FIG. 20, the CPU 11 includes at least a 2×2 sectioning unit 33, RCT unit 35, Y orthogonal transform unit 37, (U−V) averaging unit 57, V averaging unit 41, Y quantizing unit 43, (U−V) quantizing unit 59 and V quantizing unit 47.

The thus constructed CPU operates in a similar manner to the CPU 11 in the previous embodiment. Namely, the RCT unit 35 performs RCT steps on R, G, and B components, to subsequently feed, by the units of four pixels, the thus transformed signals Y to the Y orthogonal transform unit 37, color signals U and V to the (U−V) averaging unit 57, color signals V to the V averaging unit 41, respectively.

Subsequently, the (U−V) averaging unit 57 operates to compute, by the units of four pixels, the average of the difference, (U−V)a, based the color signals U and V fed as above, to subsequently be supplied to the (U−V) quantizing unit 59. The average of the difference, (U−V)a, is then quantized by the (U−V) quantizing unit 59.

As a result of the quantization, it is noted that the value of the average, (U−V)a, is represented by 9-bits data which include its 8-bits absolute value and 1-bit sign data.

Figure 21:
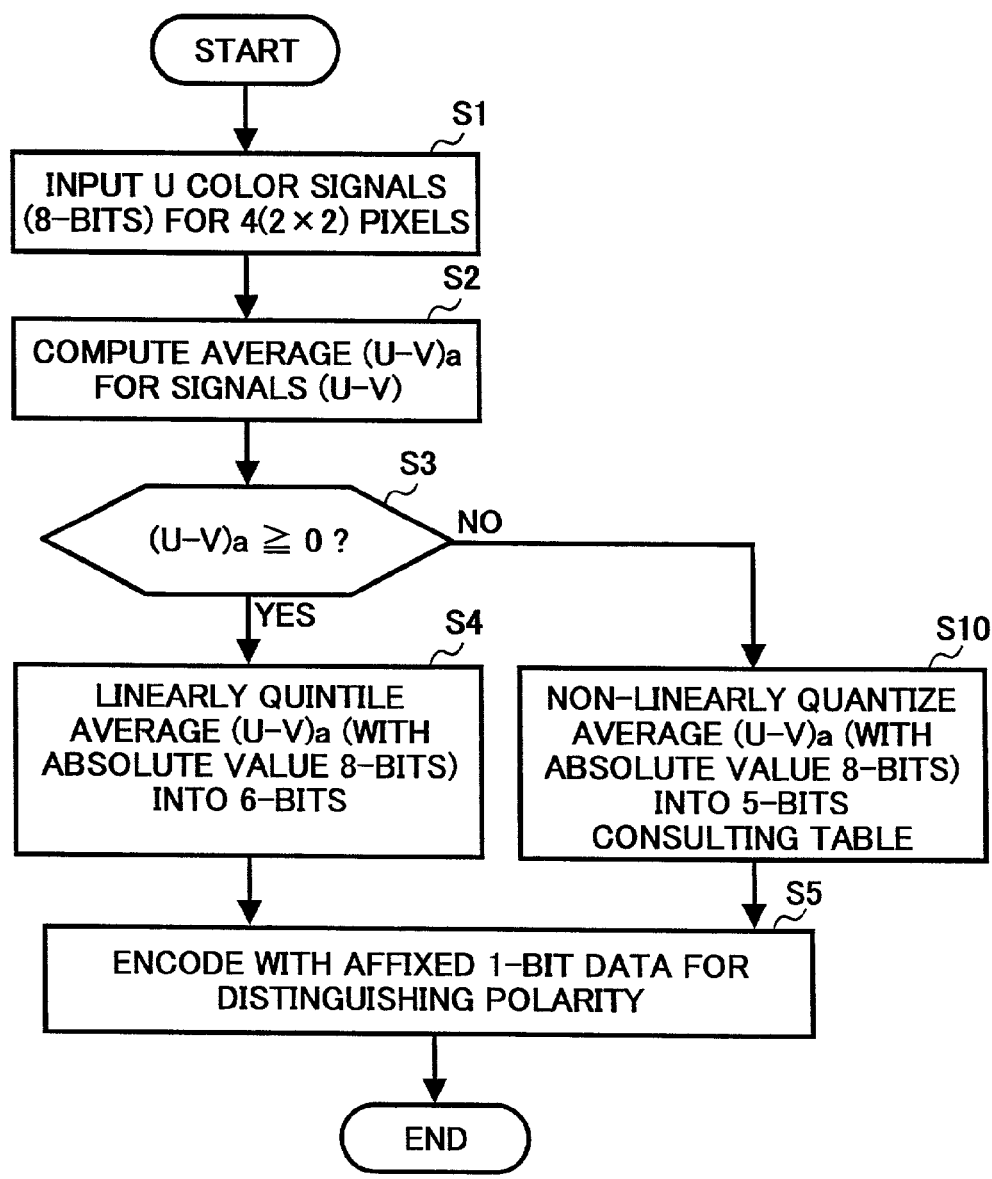
FIG. 21 is a flow chart illustrating quantization process steps for the signal (U–V) according to still another embodiment disclosed herein.

FIG. 21 is a flow chart illustrating quantization process steps for the signal (U−V) shown in FIG. 20.

Referring to FIG. 21, the process begins in step S1 where 8-bits U color signals are input for 4 picture elements of 2×2. The average (U−V)a of the color signals (U−V) for 4 picture elements of 2×2 is then computed in step S2.

After completing Step 2, an inquiry is made in step S3 regarding whether the thus obtained average (U−V)a is equal to, or greater than zero. If the response to the inquiry is affirmative, the process proceeds to step S4. However, if the response is negative, the process proceeds to step S10.

In step S4 the average (U−V)a is then linearly quantized into 6-bits data by dividing its absolute value (8-bits) by 4, while retaining its polarity sign already included.

In step 10, by contrast, the 8-bits average (U−V)a which assumes the value ranging from 0 to 255, is non-linearly quantized into 5-bits data according to a table dictating quantization threshold values, while retaining its polarity sign already included.

Since the maximum of the Lab color difference per unit quantization error of the average (U–V)a is found in the vicinity of the origin '0', the quantization threshold value may appropriately be varied so as to correspond to the polarity change of the (U–V)a average.

In addition, as described above, the quantization level number is smaller for the (U–V)a average than that for the Va average, regardless of the polarity of the (U–V)a average.

In step S5, a one-bit encoded data is affixed as a prefixed bit to the quantized average (U–V)a obtained previously in either step S4 or S10, to be utilized for distinguishing the polarity of the color signals U in later decoding steps, and the quantization steps end for the average (U–V)a.

Incidentally, with the system and method for color image signal processing according the present embodiment, calculation and quantization steps of other variables such as the brightness signals Y, average Va and color difference Lab are carried out in a similar manner to the previous embodiments.

Therefore, according to the system and method disclosed herein, the quantization for the color signals, U and V, is carried out with respect to the distance on the U versus V plane from the straight line, V=U, in inclusive of its sign, and the V color signals, thus appropriately taking the characteristics of these color signals into consideration upon the quantization.

As a result, the improvement in quantization efficiency becomes feasible, to thereby be able to reproduce color images with reduced magnitude of errors caused by the signal quantization and with satisfactory image quality after the decompression.

The systems and process steps set forth in the present description may be implemented using a conventional general purpose processor programmed according to the teachings disclosed herein, as will be appreciated to those skilled in the relevant arts. Appropriate software encoding can readily be prepared by skilled programmers based on the teachings of the present disclosure, as will also be apparent to those skilled in the relevant arts.

The present disclosure thus also includes a computer-based product which may be hosted on a storage medium and include instructions which can be used to program a processor to perform a process in accordance with the present disclosure. In addition to the hard disk device mentioned earlier in the disclosure, the storage medium can include, but is not limited to, any type of disk including floppy disks, optical disks, CD-ROMS, magneto-optical disks, ROMs, RAMs, EPROMs, EEPROMS, flash memory, magnetic or optical cards, or any type of media suitable for storing electronic instructions.

In addition, the methods disclosed herein may suitably be implemented to a wide variety of image processing systems including various application programs and device drivers such as printer drivers, among others.

It is apparent from the above description including the examples, the improvement in quantization efficiency becomes feasible through the foregoing quantization steps based on the consideration of the asymmetry of the color signal dependence of color difference.

For example, by changing the quantization level number appropriately corresponding to color signal ranges specified by the quantization threshold value at, or in vicinity of, the point of either the maximum of the color difference or color signal polarity change, the magnitude of errors caused by the color signal quantization can be made uniform within the predetermined value over the entire area of the color image.

According to the system and method disclosed herein, therefore, color images can be reproduced with reduced magnitude of errors by the signal quantization and satisfactory image quality after the signal decompression is assured. In addition, the foregoing process steps can be implemented by suitably adopted computer accessible storage media disclosed herein with a relatively reduced memory size.

Additional modifications and variations of the present invention are possible in light of the above teachings. It is therefore to be understood that within the scope of the appended claims, the invention may be practiced other than as specifically described herein.

This document claims priority and contains subject matter related to Japanese Patent Application No. 2000-225692, filed with the Japanese Patent Office on Jul. 26, 2000, the entire contents of which are hereby incorporated by reference.

What is claimed as new and desired to be secured by Letters Patent of the United States is:

1. An image processing system for processing a color signal extracted from image signals, comprising:
   quantizing means for quantizing said color signal over a plurality of quantization regions thereof such that a color difference per unit error caused by quantization of said color signal in each of said plurality of quantization regions is within a predetermined value,
   wherein said regions are obtained by computing said color difference per unit error by averaging color differences over all values of G as a parameter among components R, G and B.

2. An image processing system for processing a color signal extracted from image signals, comprising:
   quantizing means for quantizing said color signal over a plurality of quantization regions thereof such that a color difference per unit error caused by quantization of said color signal in each of said plurality of quantization regions is within a predetermined value,
   wherein said regions are obtained by computing said color difference per unit error as an envelope drawn through maximal points of color difference versus color signal plots for all values of G as a parameter among components R, G and B.

3. An image processing system for processing a component color image signal extracted from image signals, comprising:
   quantizing means for quantizing said component color image signal under a quantization level number different for each of a plurality of quantization regions specified by a value of said component color image signal corresponding to a maximum of a color difference per unit error caused by quantization of said component color image signal.

4. The image processing system according to claim 3, wherein said regions are obtained by computing said color difference per unit error by averaging color difference versus component color image signal plots over all values of G as a parameter among components R, G and B.

5. The image processing system according to claim 3, wherein said regions are obtained by computing said color difference per unit error as an envelope drawn through maximal points of color difference versus component color image signal plots for all values of G, as a parameter, among components R, G and B.

6. The image processing system according to claim 3, wherein said quantizing means linearly quantizes said component color image signal in at least one of a plurality of quantization regions specified by a value of said component color image signal, as a threshold, corresponding to at least one of a polarity change and a maximum of said polarity change.

7. An image processing system for processing a component color image signal extracted from image signals, comprising:
quantizing means for quantizing said component color image signal under a quantization level number different for each of a plurality of quantization regions specified by a value of said component color image signal corresponding to a polarity change of said component color image signal, wherein
said quantizing levels are obtained by computing a color difference per unit error as an envelope drawn through maximal points of color difference versus component color image signal plots for all values of G, as a parameter, among components R, G and B.

8. An image processing system for processing a plurality of color signals extracted from image signals, comprising:
quantizing means for quantizing one of said plurality of color signals depending on other color signals which are not presently quantized.

9. An image processing system for processing a plurality of component color image signals extracted from image signals, comprising:
quantizing means for quantizing one of said plurality of component color image signals depending on a position of said one of said plurality of component color image signals on a plane identified by a subsection of said plane;
said plane being specified by said plurality of component color image signals, as parameters, and divided into a plurality of said subsections with respect to a locus of maximal points of a color difference per unit error caused by a quantization error of said component color image signal to be presently quantized.

10. The image processing system according to claim 9, wherein said quantizing means linearly quantizes said component color image signal in at least one of said plurality of subsections.

11. An image processing system for processing first and second color signals extracted from image signals, comprising:
quantizing means for quantizing said first color signal and a distance of a position from a locus of points of equal values of said first and second color signals, said position corresponding to said first and second color signals on a plane specified by said first and second color signals.

12. The image processing system according to claim 11, wherein said quantizing means quantizes at least one of a difference between first and second color signals, and either one of said first and second color signals.

13. An image processing system for processing a color signal extracted from signals, comprising:
a quantizing device for quantizing said color signal over a plurality of quantization regions thereof such that a color difference per unit error caused by quantization of said color signal in each of said plurality of quantization regions is within a predetermined value,
wherein said regions are obtained by computing said color difference per unit error by averaging color differences over all values of G as a parameter among components R, G and B.

14. An image processing system for processing a color signal extracted from signals, comprising:
a quantizing device for quantizing said color signal over a plurality of quantization regions thereof such that a color difference per unit error caused by quantization of said color signal in each of said plurality of quantization regions is within a predetermined value,
wherein said color difference per unit error is obtained as an envelope drawn through maximal points of color difference versus color signal plots for all values of G as a parameter among components R, G and B.

15. An image processing system for processing a component color image signal extracted from image signals, comprising:
a quantizing device for quantizing said component color image signal under a quantization level number different for each of a plurality of quantization regions specified by a value of said component color image signal corresponding to a maximum of a color difference per unit error caused by quantization of said component color image signal.

16. The image processing system according to claim 15, wherein said regions are obtained by computing said color difference per unit error by averaging color difference versus component color image signal plots over all values of G as a parameter among components R, G and B.

17. The image processing system according to claim 15, wherein said regions are obtained by computing said color difference per unit error as an envelope drawn through maximal points of color difference versus component color image signal plots for all values of G, as a parameter, among components R, G and B.

18. The image processing system according to claim 15, wherein said quantizing device linearly quantizes said component color image signal in at least one of a plurality of quantization regions specified by a value of said component color image signal, as a threshold, corresponding to at least one of a polarity change and a maximum of said polarity change.

19. And image processing system for processing a component color image signal extracted from image signals, comprising:
a quantizing device for quantizing said component color image signal under a quantization level number different for each of a plurality of quantization regions specified by a value of said component color image signal corresponding to a polarity change of said component color image signal, wherein
said quantizing levels are obtained by computing a color difference per unit error as an envelope drawn through maximal points of color difference versus component color image signal plots for all values of G, as a parameter, among components R, G and B.

20. An image processing system for processing a plurality of color signals extracted from image signals, comprising:
a quantizing device for quantizing one of said plurality of color signals depending on other color signals which are not presently quantized.

21. An image processing system for processing a plurality of component color image signals extracted from image signals, comprising:
a quantizing device for quantizing one of said plurality of component color image signals depending on a position of said one of said plurality of component color image signal on a plane identified by a subsection of said plane;
said plane being specified by said plurality of component color image signals, as parameters, and divided into a plurality of said subsections with respect to a locus of maximal points of a color difference per unit error caused by a quantization error of said component color image signal to be presently quantized.

22. The image processing system according to claim 21, wherein said quantizing device linearly quantizes said component color image signal in at least one of said plurality of subsections.

23. An image processing system for processing first and second color signals extracted from image signals, comprising:

a quantizing device for quantizing said first color signal and a distance of a position from a locus of points of equal values of said first and second color signals, said position corresponding to said first and second color signals on a plane specified by said first and second color signals.

24. The image processing system according to claim 23, wherein said quantizing device quantizes at least one of a difference between first and second color signals, and either one of said first and second color signals.

25. A method for processing a color signal extracted from image signals for an image processing system, comprising:

quantizing said color signal over a plurality of quantization regions thereof such that a color difference per unit error caused by quantization of said color signal in each of said plurality of quantization regions is within a predetermined value; and computing said color difference per unit error by averaging color differences over all values of G as a parameter among components R, G and B.

26. A method for processing a color signal extracted from image signals for an image processing system, comprising:

quantizing said color signal over a plurality of quantization regions thereof such that a color difference per unit error caused by quantization of said color signal in each of said plurality of quantization regions is within a predetermined value; and obtaining said color difference per unit error as an envelope drawn through maximal points of color difference versus color signal plots for all values of G as a parameter among components R, G and B.

27. A method for processing a component color image signal extracted from image signals for an image processing system, comprising:

quantizing said component color image signal under a quantization level number different for each of a plurality of quantization regions specified by a value of said component color image signal corresponding to a maximum of a color difference per unit error caused by quantization of said component color image signal.

28. The method according to claim 27, further comprising:

obtaining said regions by computing said color difference per unit error by averaging color differences over all values of G as a parameter among components R, G and B.

29. The method according to claim 27, further comprising:

obtaining said regions by computing said color difference per unit error as an envelope drawn through maximal points of color difference versus component color image signal plots for all values of G as a parameter among components R, G and B.

30. The method according to claim 27, further comprising:

linearly quantizing said component color image signal in at least one of a plurality of quantization regions specified by a value of said component color image signal, as a threshold, corresponding to at least one of a polarity change and a maximum of said polarity change.

31. A method for processing a component color image signal extracted from image signals for an image processing system, comprising:

quantizing said component color image signal under a quantization level number different for each of a plurality of quantization regions specified by a value of said component color image signal corresponding to a polarity change of said component color image signal; and obtaining said quantizing levels by computing a color difference per unit error as an envelope drawn through maximal points of color difference versus component color image signal plots for all values of G as a parameter among components R, G and B.

32. A method for processing a plurality of color signals extracted from image signals for an image processing system, comprising:

quantizing one of said plurality of color signals depending on other color signals which are not presently quantized.

33. A method for processing a plurality of component color image signals extracted from image signals for an image processing system, comprising:

quantizing one of said plurality of component color image signals depending on a position thereof on a plane identified by a subsection of said plane; said plane being specified by said plurality of component color image signals, as parameters, and divided into a plurality of said subsections with respect to a locus of maximal points of a color difference per unit error caused by a quantization error of said component color image signal to be presently quantized.

34. The method according to claim 33, further comprising:

linearly quantizing said component color image signal in at least one of said plurality of subsections.

35. A method for processing first and second color signals extracted from image signals for an image processing system, comprising:

quantizing said first color signal and a distance of a position from a locus of points of equal values of said first and second color signals, said position corresponding to said first and second color signals on a plane specified by said first and second color signals.

36. The method according to claim 35, further comprising:

quantizing at least one of a difference between said first and second color signals, and either one of said first and second color signals.

37. A computer accessible storage medium storing computer instructions for processing a component color image signal extracted from image signals for an image processing system, wherein said computer instructions perform at least the step of quantizing said component color image signal under a quantization level number different for each of a plurality of quantization regions specified by a value of said component color image signal corresponding to a maximum of a color difference per unit error caused by quantization of said component color image signal.

38. A computer accessible storage medium storing computer instructions for processing a plurality of color signals extracted from image signals for an image processing system, wherein said computer instructions perform at least a step of quantizing one of said plurality of color signals depending on other color signals which are not presently quantized.

* * * * *